(12) United States Patent
Ishiyama

(10) Patent No.: US 8,265,343 B2
(45) Date of Patent: Sep. 11, 2012

(54) APPARATUS, METHOD AND PROGRAM FOR DISTANCE MEASUREMENT

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 793 days.

(21) Appl. No.: 12/443,551

(22) PCT Filed: Dec. 25, 2007

(86) PCT No.: PCT/JP2007/074839
§ 371 (c)(1),
(2), (4) Date: Mar. 30, 2009

(87) PCT Pub. No.: WO2008/078744
PCT Pub. Date: Jul. 3, 2008

(65) Prior Publication Data
US 2010/0046801 A1 Feb. 25, 2010

(30) Foreign Application Priority Data
Dec. 25, 2006 (JP) .................................. 2006-347777

(51) Int. Cl.
*G06K 9/00* (2006.01)
(52) U.S. Cl. ......................... 382/106; 382/154; 356/4.01
(58) Field of Classification Search .................. 382/100, 382/106, 154; 356/4.01, 3
See application file for complete search history.

(56) References Cited

U.S. PATENT DOCUMENTS

| 6,421,629 | B1 * | 7/2002 | Ishiyama | 702/159 |
| 7,078,720 | B2 * | 7/2006 | Yamaguchi | 250/559.38 |
| 7,092,563 | B2 * | 8/2006 | Shiratani | 382/154 |
| 7,315,643 | B2 * | 1/2008 | Sakamoto et al. | 382/154 |

FOREIGN PATENT DOCUMENTS

| JP | 1988304791 A | 12/1988 |
| JP | 1999053549 A | 2/1999 |
| JP | 2003021505 A | 1/2003 |
| JP | 2006084286 A | 3/2006 |

OTHER PUBLICATIONS

International Search Report for PCT/JP2007/074839 mailed Feb. 5, 2008.
W.-S. Zhou et al., "A direct mapping algorithm for phase-measuring profilometry", Journal of Modem Optics, vol. 41, No. 1, Jan. 1994, p. 89-94.
A. Asundi et al., "Unified calibration technique and its applications in optic triangular profilometry", Applied Optics, vol. 38, No. 16, Jun. 1, 1999.
W. Li et al., "Large-Scale three-dimensional object measurement: a practical coordinate mapping and image data-patching method", Applied Optics, vol. 40, No. 20, Jul. 10, 2001.

\* cited by examiner

*Primary Examiner* — Andrew W Johns
*Assistant Examiner* — Shefali Goradia

(57) ABSTRACT

A depth distance of a target point for measurement can be found by exploiting the equality of a cross ratio of phases of reference data points and a target point for measurement to a cross ratio of depth distances of these points. The depth distance of the target point for measurement can also be determined by exploiting the equality of a cross ratio of the distances among a set of projection points corresponding to projection of reference data points and a target point on a reference plane; of a cross ratio of distances among a set of image projection points corresponding to projection of a set of projection points on an image; and of a cross ratio of distances of a set of points which are equiphase to a set of image projection points on an arbitrary straight line on an image, respectively, relative to the cross ratio of the depth distances.

20 Claims, 9 Drawing Sheets

APPARATUS, METHOD AND PROGRAM FOR DISTANCE MEASUREMENT

REFERENCE TO RELATED APPLICATION

This application is the National Phase of PCT/JP2007/074839, filed Dec. 25, 2007, which is based upon and claims the benefit of the priority of Japanese patent application No. 2006-347777 filed on Dec. 25, 2006, the disclosure of which is incorporated herein in its entirety by reference thereto.

TECHNICAL FIELD

This invention relates to a three-dimensional shape measurement technique, that is, to an apparatus, a method and a program for measuring a three-dimensional shape. More particularly, it relates to a method and apparatus for three-dimensional shape measurement, a program for allowing a computer to execute three-dimensional shape measurement, and a computer-readable recording medium having the program recorded thereon.

BACKGROUND ART

Recently, with progress in the non-contact three-dimensional shape measurement technique, it has become easier to obtain a three-dimensional model of a natural object, where there lacks a design drawing or CAD data, such as a human body. As a result, three-dimensional models are finding applications in a number of technical fields. A three-dimensional shape model of a human body is used in a variety of sectors, such as apparel, medical treatment or computer graphics (CG). In these days, also such a technique has been proposed which utilizes the three-dimensional shape data of a human face for authentication of individuals.

As non-contact three-dimensional shape measurement technique, a variety of techniques, such as the flying time measurement method, moiré measurement method or the pattern projection method, have so far been proposed. In general, the flying time measurement method is a particular technique, both for transmission and reception, and is in need of a high precision measurement apparatus. The moiré measurement method allows for measurement only of a relative shape with respect to a reference shape. In contrast, the pattern projection method allows shape measurement to high precision at a relatively lower cost. In addition, the pattern projection method has various merits, such as allowing for photographing a textured image with the same camera as that used for shape measurement. Larger numbers of three-dimensional shape measurement apparatus, employing the pattern projection technique, have been fabricated and presented to the market. In a classical pattern projection method, a projector-camera set is used, and measurement is made of the three-dimensional shape (depth) based on the principle of triangulation. Initially, a light pattern, encoded with the direction of projection (position of an intersection of the light ray and a projector grating) as phase, is projected by the projector, and a pattern, obtained on reflection, is image-shot by the camera. A luminance pattern of the shot image is then decoded to restore the phase. Geometrical model parameters, such as the position or the orientation of the projector or the focal length of the projector lens, are determined from the outset, whereby it becomes possible to determine a line (or a plane) of projection directed to a target point for measurement by the projector based on the phase restored. In case geometrical model parameters of the camera are also determined from the outset, the line of sight of the camera, associated with a pixel of interest, may be determined. A three-dimensional coordinate of the target point of measurement may be determined by finding a point of intersection of the line of sight of the camera and the projection line (plane) of the projector.

Depending on the sorts of projected patterns, the following three techniques are used as the main techniques for measurement of the three-dimensional shape by the pattern projection method. Although a light wave pattern is taken as an example of the projected pattern, the pattern may also be that of a sound wave, or any other wave. Thus, the terms 'projector' and the 'camera' may also be a 'pattern projection unit' or a 'pattern imaging unit' associated with any particular wave used.

Among the techniques used in the pattern projection method, a spot or slit light scanning method, employing laser light, is most popular. With this technique, an image is taken (shot, i.e., scanned) as the direction of projection of the laser light is gradually changed along time, and the shot images are subjected to binary coding to determine a line (or plane) of projection from the projector for the detected point of observation. This system is robust against ambient light and allows measurement to remote points because of strong contrast obtained with the laser light. However, measurement may be made only of a single point by one-step projection and image-shooting. In the case of scanning by slit light, only a single point on a curve may be measured. Thus, to effect high density measurement in a short time, a special mechanism that allows high speed scanning and image-shooting at a high frame rate is required. This known technique may be deemed to be a pattern projection method with the use of a delta function as a projection pattern, with the phase being equivalent to the position of intersection of a projector grating and the projected laser light. For example, assume that the direction of illumination of the laser light is changed at a constant angular velocity $\omega$ and that the luminance value of a given pixel becomes higher than a threshold value at a time point $\tau$. If, in this case, a projector grating is positioned at a distance equal to 1 from the projector center, the phase, which is the position of the point of intersection of the projected light with the projector grating, is as follows: $\phi = \tan(\omega\tau)$.

The spatial coding method is such a technique that projects a binary pattern changing with time to encode the direction (plane) of projection so that each domain of the projector grating will be of a unique pattern. Liquid crystal projectors, capable of projecting variegated patterns, have now come into widespread use. Thus, the spatial coding method has become popular as being a technique that allows a range finder to be constructed inexpensively only with the use of general-purpose components without using special systems, such as laser scanners. With this known method, depth resolution equal to as high as 2" may be obtained with an n-number of times of projections. Thus, the number of times of projection necessary to achieve the same depth resolution may be lesser than the case with the spot or slit scanning method. The n-bit digital value, restored with the present known method, corresponds to an encoded digital value of a phase which is the position of intersection of the projector grating with the projected light.

The phase shifting method is the technique of projecting a pattern obtained on encoding the direction of projection with the phase of the analog value. This known method allows a high depth resolution to be obtained with the number of projection steps further smaller than the case with the above techniques. This known method uses a sinusoidal pattern, obtained on encoding the direction of projection as an initial phase, and shoots images as the phase is changed for one period. The phase corresponding to an encoded direction of projection is calculated by fitting a sine wave to time changes of luminance values of the respective pixels of the shot image (s). The present known method allows high-speed three-dimensional shape measurement because the number of the projection patterns may be reduced to a number as small as three as the minimum value. The method also has a number of merits. Thus, as a principle, three-dimensional shape measurement may be made simultaneously for all pixels of the image, and a textured image may be measured at the same time as the image shape is measured. Further, depth measurement may be improved in accuracy by increasing the number of steps. In particular, measurement to high precision may be achieved even with a smaller number of steps by projecting a plurality of repeated patterns and by shortening the depth distance corresponding to one period.

Non-Patent Document 1: Zhou W.-S., Su, X.-Y., A Direct Mapping Algorithm for Phase-measuring Profilometry, Journal of Modern Optics, Volume 41, Number 1, January 1994, pp. 89-94(6)

Non-Patent Document 2: Anand Asundi and Zhou Wensen, Unified calibration technique and its applications in optic triangular profilometry, APPLIED OPTICS/Vol. 38, No. 16/1 Jun. 1999

Non-Patent Document 3: W. Li, X. Su, Z. Liu, Large-Scale three-dimensional object measurement: a practical coordinate mapping and image data-patching method, J. Applied Optics, 40(20), 3326-3333, 2001

DISCLOSURE OF THE INVENTION

Problems to be Solved by the Invention

The disclosures of the above non-Patent Documents 1 to 3 are to be incorporated herein by reference thereto. The following is an analysis on the related art from the view of the present invention.

In the above-described classical techniques of three-dimensional shape measurement, based on the pattern projection method, three-dimensional coordinates are calculated from the phase observed based on the camera-projector geometrical model. Initially, the geometrical model parameters, such as positions, orientations of focal lengths of the camera-projector, are determined by exploiting routine camera calibration techniques. Using the geometrical model parameters, the line of sight is determined from the position of the pixel on an image being viewed, and the line (plane) of projection is determined from the phase. A three-dimensional coordinate of a target point to be measured is then determined as a point of intersection of the line of sight and the line (plane) of projection. However, this processing of calibration is not necessarily an optimum parameter determining unit and is prone to errors. Moreover, in case where the projector is not provided with the function of projecting a pattern suited for the processing of calibration, it may sometimes occur that calibration cannot be carried out.

To address to this problem, there is disclosed in Non-Patent Document 1 a method for three-dimensional shape measurement based on the pattern projection method in which it is unnecessary to calibrate the geometrical model parameters of the projector. This method directly finds the depth distance from the phase using the relationship that holds between the phase and the depth distance of the point to be measured. A target object is placed beforehand at a known depth position and measurement is carried out to get reference data. The coefficient of the above relationship is found by regression to the reference data to directly compute the depth distance from the phase as measured using the above relationship.

In implementing the above-described three-dimensional shape measurement technique, employing the above-described pattern projection, the following errors may be encountered:
1. errors in the geometrical model of the camera and projector, and in parameters to be determined beforehand, such as positions, orientations or lens distortions;
2. noise in shooting an image by a camera; and
3. errors in pattern projection by a projector, such as errors in pattern preparation, errors in the driving system, blurring or lens distortions.

The errors 1 are errors proper to the system (systematic errors), that is, errors that occur again and again unless the shape or the structure of the system is changed.

The errors 2 and 3 include also systematic errors. In addition, the errors incurred may be random errors, that is, errors changed from one measurement operation to another. Since the random errors may not be known at the outset, they are difficult to correct by advance correcting operations of some sort or other.

However, the systematic errors may be grasped at the outset. Thus, a variety of correction techniques have so far been proposed.

As an example of such correction techniques, the technique of Non-Patent Document 2 has been proposed. To correct the systematic errors, this known technique divides the range of depth into a number of domains, and a number of reference data are measured to find an expression of regression from one domain to another.

To correct systematic errors produced as low frequency components for the depth coordinate, such as lens distortions, there is a technique shown in Non-Patent Document 3 that uses a quadratic polynomial regression.

However, the known technique suffers the problem that the errors in the projection pattern in case of projection of a short-period repetitive pattern are of high frequency and hence cannot be corrected with the second-order term.

With any of the above techniques, it is necessary to measure an extremely large number of points if high frequency systematic errors ascribable to distortions of the projection patterns are to be corrected. The number of the points is to be equal to or larger than the number of the frequency components of the errors. As a result, manufacture and adjustment of the apparatus are extremely labor-consuming. In addition, special equipment is needed, resulting in increase in costs.

Since the relationship between the direction of projection of the pattern from the projector and the pattern really measured suffers from errors proper to the system (systematic errors), the result of three-dimensional shape measurement necessarily suffers systematic errors unless geometrical parameters of the projector are calibrated.

Moreover, to correct these errors, large quantity of reference data need to be measured in advance, thus presenting a problem that maintenance of the three-dimensional shape measurement apparatus is also labor-consuming. It is therefore an objective to provide a three-dimensional shape measurement apparatus capable of measuring the depth distance at high accuracy without necessity of calibrating the geometrical model parameters of the pattern projection unit. It is also an objective to provide a three-dimensional shape measurement apparatus in which it is unnecessary to measure large quantity of reference data beforehand.

Means for Solving the Problem

In a first aspect of the present invention, there is provided an apparatus for distance measurement in which a depth distance down to a target point is measured as a phase is entered to the apparatus as an input. The phase is a quantity that represents a change of a pattern projected on a target point the depth distance of which is to be measured. The pattern is varied depending on directions of projection from pattern projection unit, and the phase is measured by observing a reflection of the pattern. The apparatus comprises a phase cross ratio calculating unit for receiving a phase of the target point and phases of three reference points lying on a line of light on which the target point has been measured, and for calculating a phase cross ratio to output the phase cross ratio calculated. The apparatus also comprises a depth distance calculating unit for receiving the depth distances of the reference points and the phase cross ratio and for calculating the depth distance of the target point by exploiting the equality of the phase cross ratio and a depth distance cross ratio of depth distances between the reference points and the target point.

In a distance measurement apparatus according to a first exemplary embodiment, there is preferably provided three-dimensional coordinate calculating unit for receiving geometrical model parameters regarding the position relative to a measurement coordinate system, orientation and focal length of a pattern projection unit which has observed the pattern, and the depth distance of the target point, and for calculating three-dimensional coordinates of the target point In a distance measurement apparatus according to a second exemplary embodiment, the phase cross ratio calculating unit preferably selects three points out of four or more reference points, as proximity points, on the line of sight on which the target point has been measured. These three points have phase values closest to the phase of the target point. The phase cross ratio calculating unit calculates a phase cross ratio of the phases of the proximity points and the target point. The depth distance calculating unit takes the proximity points as the reference points.

In a second aspect of the present invention, there is provided an apparatus for distance measurement in which a depth distance down to a target point is measured as a phase is entered to the apparatus as an input. The phase is a quantity representing a change of a pattern projected on a target point a depth distance of which is to be measured. The pattern is varied depending on directions of projection from pattern projection unit. The phase is measured by observing a reflection of the pattern. The apparatus comprises an image projection point search unit for receiving a reference phase image, which is a phase of a linear part of an object containing the linear part, phases and depth distances of three reference points lying on the line of sight on which the target point has been measured, and a phase of the target point. The image projection point search unit searches for the positions of image projection points on the reference phase image which are points having phase values coincident with phases of the reference points and the target point. The image projection point search unit calculates the distances among the image projection points and outputs the calculated distances as image distances. The apparatus also comprises an image distance cross ratio calculating unit for receiving the image distances, calculating a cross ratio of distances among the image projection points, as an image distance cross ratio, and for outputting the image distance cross ratio calculated. The apparatus further comprises a depth distance calculating unit for receiving the depth distances of the reference points and the image distance cross ratio and for calculating a depth distance of the target point by exploiting the equality of the image distance cross ratio and a depth distance cross ratio of the depth distances among the reference points and the target point.

In a distance measurement apparatus according to a third exemplary embodiment, the image projection point search unit preferably takes, from a phase image for a plurality of linear portions on a surface of the object, an image containing points equal to phases of the reference points and the target point as the reference phase image.

In a distance measurement apparatus according to a fourth exemplary embodiment, the image projection point search unit preferably extracts, from a phase image for a planar area on a surface of the object, a linear area containing pixels equal to the phases of the reference points and the target point, as a search straight line, and searches for the image projection points on the search straight line.

In a distance measurement apparatus according to a fifth exemplary embodiment, the image projection point search unit preferably decides, from a phase image for a plurality of planar areas, on a linear area containing pixels equal to phases of the reference points and the target point, as a search straight line. The image projection point search unit searches for the image projection points on the search straight line.

In a third aspect, the present invention provides an apparatus for distance measurement in which a depth distance down to a target point is measured as a phase is entered to the apparatus as input. The phase is a quantity representing a change of a pattern projected on a target point a depth distance of which is to be measured. The pattern is varied depending on directions of projection from pattern projection unit, and the phase is measured by observing a reflection of the pattern. The apparatus comprises an image projection point search unit for taking a phase image, measured for a linear area that stands for the three-dimensional shape of a target object for measurement, as a reference phase image, and for searching for image projection points on the reference phase image. The image projection points are points having phases coincident with a phase of the target point and with phases of three reference points lying on the line of sight on which the target point has been measured. The image projection point search unit calculates distances among the image projection points and outputs the calculated distances as image distances. The apparatus further comprises an image distance cross ratio calculating unit for receiving the image distances, calculating a cross ratio of distances among the image projection points as an image distance cross ratio, and for outputting the distance cross ratio calculated. The apparatus further comprises a depth distance calculating unit for receiving the depth distances of the reference points and the image distance cross ratio and for calculating a depth distance of the target point by exploiting the equality of the image distance cross ratio and a depth distance cross ratio of the depth distances among the reference points and the target point.

In a distance measurement apparatus according to a sixth exemplary embodiment, the image projection point search unit preferably takes the phases for a plurality of linear portions on a surface of an object as a reference phase image. The image projection point search unit extracts, from the reference phase image, an image containing pixels equal to phases of the reference points and the target point, as a search straight line, and searches for the image projection points on the search straight line.

In a distance measurement apparatus according to a seventh exemplary embodiment, the image projection point search unit preferably takes phase values of a planar area that stands for a three-dimensional shape of the target object for measurement as a reference phase image. The image projection point search unit extracts, from the reference phase image, a linear area containing pixels having phases equal to phases of the reference points and the target point, as a search straight line, and searches for the image projection points on the search straight line.

In a distance measurement apparatus according to an eighth exemplary embodiment, the image projection point search unit preferably takes phase values of a plurality of planar areas that stand for a three-dimensional shape of a target object for measurement as a reference phase image. The image projection point search unit extracts, from the reference phase image, a linear area containing pixels having phases equal to phases of the reference points and the target point, as a search straight line, and searches for the image projection points on the search straight line.

In a distance measurement apparatus according to a ninth exemplary embodiment, the reference phase image is preferably measured at the same time as the phase of the target point is measured.

In a distance measurement apparatus according to a tenth exemplary embodiment, the image projection point search unit takes one of straight lines on an image closest to the target point as a straight search line in the reference phase image.

In a distance measurement apparatus according to an eleventh exemplary embodiment, the image projection point search unit takes one of straight lines closest to a straight line passing through a point on an image observing the target point, or a straight line passing through an epipolar point for the pattern projection unit, as a straight search line in the reference phase image.

In a distance measurement apparatus according to a twelfth exemplary embodiment, the image projection point search unit preferably takes only a phase image lying on a predetermined straight line as the reference phase image.

In a fourth aspect, the present invention provides a method for distance measurement in which a depth distance down to a target point is measured based on a phase which is a quantity representing a change of a pattern projected on a target point whose depth distance is to be measured. The pattern is varied depending on directions of projection from pattern projection unit. The phase is measured by observing a reflection of the pattern. The method for distance measurement comprises a phase cross ratio calculating step of calculating a phase cross ratio based on a phase of the target point and phases of three reference points lying on a line of light on which the target point has been measured, and outputting the phase cross ratio calculated. The method for distance measurement also comprises a depth distance calculating step of calculating a depth distance of the target point based on depth distances of the reference points and the phase cross ratio by exploiting the equality of the phase cross ratio and a cross ratio of depth distances among the reference points and the target point.

A distance measurement method according to a thirteenth exemplary embodiment preferably further comprises a three-dimensional coordinate calculating step of calculating three-dimensional coordinates of the target point based on geometrical model parameters regarding a position relative to a measurement coordinate system, orientation and the focal length of the pattern projection unit which has observed the pattern, and the depth distance of the target point.

In a distance measurement method according to a fourteenth exemplary embodiment, the phase cross ratio calculating step preferably selects three out of four or more reference points on the line of sight on which the target point has been measured, as proximity points, the three points having phase values closest to the phase of the target point. The phase cross ratio calculating step calculates the phase cross ratio of the proximity points and the target point. The depth distance calculating step preferably takes the proximity points as the reference points.

In a fifth aspect, the present invention provides a method for distance measurement in which a depth distance down to a target point is measured based on a phase which is a quantity representing a change of a pattern projected on a target point whose depth distance is to be measured. The pattern is varied depending on directions of projection from pattern projection unit. The phase is measured by observing a reflection of the pattern. The method for distance measurement comprises an image projection point search step. The image projection point search step searches for the positions of image projection points, based on a reference phase image which is a phase of a linear part on an object, the phases and the depth distances of three reference points lying on the line of sight on which the target point has been measured, and the phase of the target point. The image projection points are the points on the reference phase image having phase values coincident with phases of the reference points and the target point. The image projection point search step calculates the distances among the image projection points and outputs the calculated distances as image distances. The method for distance measurement also comprises an image distance cross ratio calculating step of calculating a cross ratio of distances among the image projection points as an image distance cross ratio, based on the image distances, and outputting the image distance cross ratio calculated. The method for distance measurement further comprises a depth distance calculating step of calculating the depth distance of the target point by exploiting the equality of the image distance cross ratio and a depth distance cross ratio of the depth distances among the reference points and the target point, based on the depth distances of the reference points and the image distance cross ratio.

In a distance measurement method according to a fifteenth exemplary embodiment, the image projection point search step preferably takes, from a plurality of phase images for a plurality of linear portions on a surface of the object, a phase image containing points equal to the phases of the reference points and the target point as the reference phase image.

In a distance measurement method according to a sixteenth exemplary embodiment, the image projection point search step preferably extracts, from a phase image for a planar area on a surface of the object, a linear area containing pixels equal to the phases of the reference points and the target point, as a search straight line, and searches for the image projection points on the search straight line.

In a distance measurement method according to a seventeenth exemplary embodiment, the image projection point search step preferably decides on a linear area containing pixels equal to phases of the reference points and the target point as a search straight line, from a phase image for a plurality of planar areas. The image projection point search step searches for the image projection points on the search straight line.

In a sixth aspect, the present invention provides a method for distance measurement in which a depth distance down to a target point is measured based on a phase which is a quantity representing a change of a pattern projected on a target point whose depth distance is to be measured. The pattern is varied with directions of projection from pattern projection unit. The phase is measured by observing a reflection of the pattern. The method for distance measurement comprises an image projection point search step of taking a phase image, measured for a linear area that stands for a three-dimensional shape of a target object for measurement, as a reference phase image, and searching for image projection points on the reference phase image. The image projection points are points having phases coincident with a phase of the target point and with phases of three reference points lying on the line of sight on which the target point has been measured. The image projection point search step calculates distances among the image projection points and outputs the calculated distances as image distances. The method for distance measurement also comprises an image distance cross ratio calculating step of calculating a cross ratio of distances among the image projection points as an image distance cross ratio, based on the image distances, and outputting the image distance cross ratio calculated. The method for distance measurement further comprises a depth distance calculating step of calculating a depth distance of the target point based on the depth distances of the reference points and the image distance cross ratio by exploiting the equality of the image distance cross ratio and the depth distance cross ratio of the depth distances among the reference points and the target point.

In a distance measurement method according to an eighteenth exemplary embodiment, the image projection point search step preferably takes, as a reference phase image, a phase image for a plurality of linear portions on a surface of the object. The image projection point search step extracts, from the reference phase image, an image containing pixels equal to phases of the reference points and the target point, as a search straight line, and searches for the image projection points on the search straight line.

In a distance measurement method according to a nineteenth exemplary embodiment, the image projection point search step preferably takes values of a planar area that stands for a three-dimensional shape of the target object for measurement as a reference phase image. The image projection point search step extracts, from the reference phase image, a linear area containing pixels having phases equal to phases of the reference points and the target point, as a search straight line, and searches for the image projection points on the search straight line.

In a distance measurement method according to a twentieth exemplary embodiment, the image projection point search step preferably takes phase values of a plurality of planar areas that stand for a three-dimensional shape of the target object for measurement, as a reference phase image. The image projection point search step extracts, from the reference phase image, a linear area containing pixels having phases equal to phases of the reference points and the target point, as a search straight line, and searches for the image projection points on the search straight line.

In a distance measurement method according to a twenty-first exemplary embodiment, the reference phase image is preferably measured at the same time as the phase of the target point is measured.

In a distance measurement method according to a twenty-second exemplary embodiment, the image projection point search step preferably takes one of straight lines closest to the target point on an image as a straight search line in the reference phase image.

In a distance measurement method according to a twenty-second exemplary embodiment, the image projection point search step preferably takes a straight line of a direction closest to a straight line passing through a point on an image which observes the target point, or to a straight line passing through an epipolar point for the pattern projection unit, as a straight search line in the reference phase image.

In a distance measurement method according to a twenty-fourth exemplary embodiment, the image projection point search step takes only a phase image on a predetermined straight line as the reference phase image.

A program for distance measurement according to a twenty-fifth exemplary embodiment preferably allows a computer to execute the processing by the above distance measurement method.

MERITORIOUS EFFECT OF THE INVENTION

Effects of the Invention

According to the present invention, the depth distance of a target point in three-dimensional shape measurement may be calculated directly from the measured phase without using geometrical model parameters of pattern projection unit. It is therefore possible to measure the depth distance at high accuracy without calibrating geometrical model parameters of the pattern projection unit.

In addition, according to the present invention, the depth distance may be measured using the phases actually measured. Thus, using the relationship between the phases as measured and the depth distances, it is possible to correct errors in pattern projection and observation to effect high precision measurement. It is therefore unnecessary to measure large quantity of reference data to correct the errors.

Figure 1:
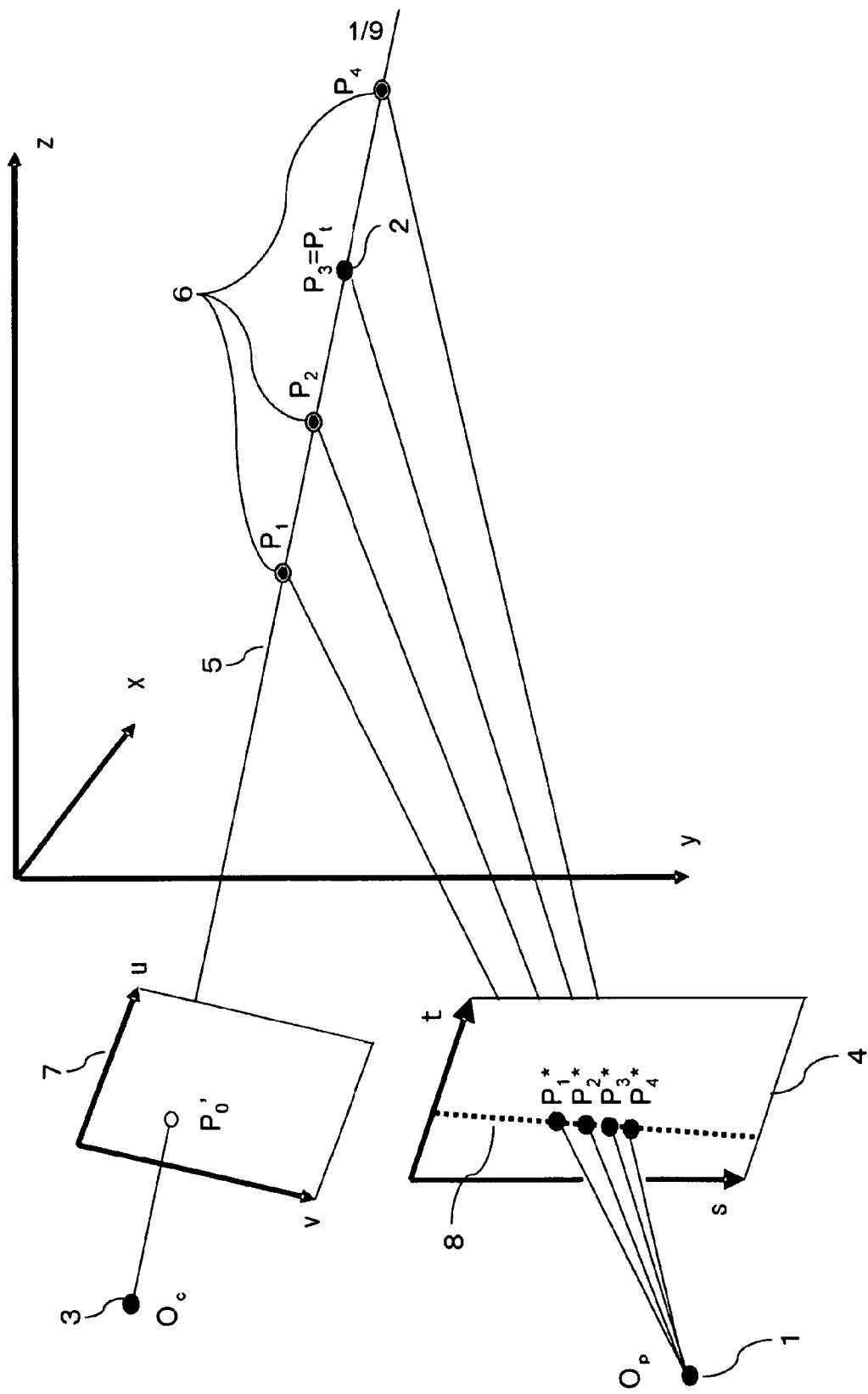
FIG. 1 is a schematic view for illustrating a geometrical model for three-dimensional shape measurement based on a pattern projection method.

DESCRIPTION OF REFERENCE SIGNS 1 projector center
2 target point
3 camera center
4 projector grating
5 line of sight of camera (viewing line of camera)
6 set of reference points
7 camera image
8 epipolar line on projector grating
9 epipolar line on camera image
10 reference plane
11 arbitrary line α on camera image
12 reference line α"
1000 computer
1020 memory unit
1040 phase cross ratio computing unit
1041 image distance cross ratio calculating unit 1050 depth distance calculating unit A
1051 depth distance measurement unit B
1060 three-dimensional coordinate calculating unit
1061 image projection point search unit
1062 planar/linear area information
1100 measurement unit
1101 reference point measurement unit
1102 target point measurement unit
1103 reference phase image measurement unit A
1104 reference phase image measurement unit B
1110 projector
1120 camera
1130 camera parameters
1200 target object for measurement

PREFERRED MODES FOR CARRYING OUT THE INVENTION

A distance measurement apparatus (three-dimensional shape measurement apparatus) according to an exemplary embodiment of the present invention is now described. The present exemplary embodiment, shown in FIG. 1, exploits the equality of the cross ratio of the depth distances of a group or set of reference points (termed "set of reference points") 6 and a target point of measurement 2 to the cross ratio of the phases of the set of reference points 6 and the target point of measurement 2. The three-dimensional shape measurement apparatus of the present exemplary embodiment includes a phase cross ratio calculating unit and a depth distance calculating unit. The phase cross ratio calculating unit calculates a cross ratio of phases measured of the set of reference points 6 and from the target point of measurement 2. The depth distance calculating unit calculates a depth distance of the target point of measurement 2 using depth distances of the set of reference points 6 and the calculated cross ratio. The depth distance of a given point unit the distance of the point along the z-direction as measured from a camera center 3 as reference, and the depth coordinate unit a z-coordinate of the point in question. It should be noted that the reference of the depth distance is not limited to the camera center 3 and may be selected optionally because the value of the cross ratio is not dependent on the reference position. Hence, in the description to follow, the depth distance may read for the depth coordinate and vice versa.

The three-dimensional shape measurement apparatus of the present exemplary embodiment utilizes the equality of a distance cross ratio of the distances of a set of projection points $\{P_i''\}$, a distance cross ratio of the distances of a set of image projection points $\{P_i'\}$ and a cross ratio of the depth distances to one another. The set of the projection points $\{P_i''\}$ is a set of points of projection of the set of the reference points 6 and the target point 2 on a reference plane (i.e., reference plane 10). The set of image projection points $\{P_i'\}$ is a set of points of projection of the set of the projection points on an image. The three-dimensional shape measurement apparatus of the present exemplary embodiment further includes an image projection point search unit and an image distance cross ratio calculating unit. The image projection point search unit searches for the set of image projection points $\{P_i'\}$ on a phase image with which the reference plane 10 has been measured, and the image distance cross ratio calculating unit finds the cross ratio of the distances among (or between) the set of the image projection points $\{P_i'\}$.

FIG. 1 depicts a schematic view for illustrating a geometrical model of three-dimensional shape measurement based on the pattern projection method.

Let the center 1 of a projector projecting a pattern for three-dimensional shape measurement (projector center 1) be a point $O_P$. Also, let the center 3 of a camera photographing an image of the pattern (camera center 3) be a point $O_C$. A pattern obtained on having a phase $\phi$ changed along a coordinate axis s on a projector grating 4 is projected from the projector center 1 towards the target point of measurement 2 ($P_t$). The projected pattern is image-shot by the camera, and the phase $\phi$ is restored from a luminance pattern of a camera image 7 observed.

Now consider a possible relationship that holds between a depth distance z and the phase $\phi$ with respect to an optional point on a line of sight of the camera 5 as observed at a pixel $P_0'(u, v)$ on the camera image 7. In the explanation to follow, an axis z of the measurement coordinate system is selected so that the angle it makes with the line of sight of the camera 5 is the least among the angles the other axes (x-axis and y-axis) make with the line of sight of the camera. In the following, the z-axis is referred to as a depth coordinate.

Let the points on the projector grating 4, projected on four points $P_i$ (i=1, 2, 3, 4) on the camera line of sight 5, be $P_i^*$. These points $P_i^*$ of a set of points $\{P_i^*\}$ are perspective-projections of the points $P_i$ of a set of points $\{P_i\}$. The values of the cross ratio of respective points are saved. At this time, the following equation is valid:

$$R(\{P_i^*\})=R(\{P_i\}) \quad (1)$$

where $R(\{P_i^*\})=P_1^*P_3^* \cdot P_2^*P_4^*/P_2^*P_3^* \cdot P_1^*P_4^*$, and $R(\{P_i\})=P_1P_3 \cdot P_2P_4/P_2P_3 \cdot P_1P_4$. A symbol AB denotes a distance between the points A and B.

Hence, with the depth coordinate z of the point $P_i$ being $z_i$ and with a position of the point $P_i^*$ on the projector grating 4 being $s_i$, the following equations hold:

$$R(\{s_i\})=R(\{P_i^*\}) \quad (2)$$

and $$R(\{P_i\})=R(\{z_i\}) \quad (3)$$

where $R(\{s_i\})=(s_3-s_1)(s_4-s_2)/(s_3-s_2)(s_4-s_1)$.

Let it be assumed that the phase $\phi$ of a pattern projected is proportional to a position s on the projector grating 4, and that the phase $\phi$ may correctly be restored from the observed pattern. If the phase of the point $P_i^*$ is labeled $\phi_i$, the following equation hold:

$$R(\{\phi_i\})=R(\{s_i\}) \quad (4)$$

Thus, from the equations (1) to (4), the following equation:

$$R(\{\phi_i\})=R(\{z_i\}) \quad (5)$$

may be derived.

Thus, if phases $\phi_i$ and depth coordinates $z_i$ of three points out of the four points $\{P_i\}$ are known, a depth coordinate $z_t$ of the remaining one point $P_t$ may be found by the equation (5) by measuring its phase $\phi_t$.

In the following, the points with the known phases and depth coordinates are termed points of a set of reference points 6, and a target point of measurement, the depth coordinate of which is desired to be measured, is termed a target point (target point 2). For example, FIG. 1 shows that three points P1, P2 and P4 out of the four points $\{Pi\}$ are the points of the set of reference points 6 and that the point P3 is the target point 2.

In the above processing for finding the depth distance, none of parameters concerning the geometrical model of the projector (geometrical model parameters) are used, so that, with the present technique, three-dimensional shape measurement may be conducted without the necessity of calibrating the geometrical model of the projector.

However, in real apparatus, it may sometimes occur that the pattern projected is not completely coincident with the design pattern. Moreover, errors may be generated when reproducing the phase φ from the as-observed pattern.

These errors may be variegated depending on the sorts of the patterns or the methods for recovering the phase used. The case of using the projection of a sinusoidal pattern and a phase shifting method is now described as an example.

Among the methods of implementing the phase shifting, there is such a method in which a sinusoidal pattern, the phase of which is changed in proportion to the coordinate axis s, is printed on a film for use as the projector grating 4, and in which the so produced film is driven by e.g., a motor along the coordinate axis s. At this time, the projected pattern may not be a correct sinusoidal wave, due to errors contained in the gray scale levels in the printing. On the other hand, the amount of phase shifting may be deviated from the design value due to errors contained in the driving direction or in the distance of the projector grating 4.

In particular, while the driving quantity may be maintained constant at all times with ease by applying devices on a driving mechanism, precise matching of absolute values of the driving quantities to design values is difficult and expensive. As regards the gray scale levels in the printing, it may be easy to render the gray scale level immune from occasional variations. However, printing with the gray scale levels precisely to designed values is again difficult and expensive.

Thus, with real apparatus, the phase φ, projected and observed, is not free from systematic errors, and hence the phase φ and the position s on the projector grating do not satisfy the as-designed proportional relationship. Strictly speaking, the equation (4) thus may not hold, such that calculations of the depth distance by the equation (5) may be corrupted with errors inherent to the system (systematic errors).

Thus, in the present exemplary embodiment, such a technique is proposed which corrects the error generated in the relationship between the measured phase φ and the position s on the projector grating.

Figure 2:
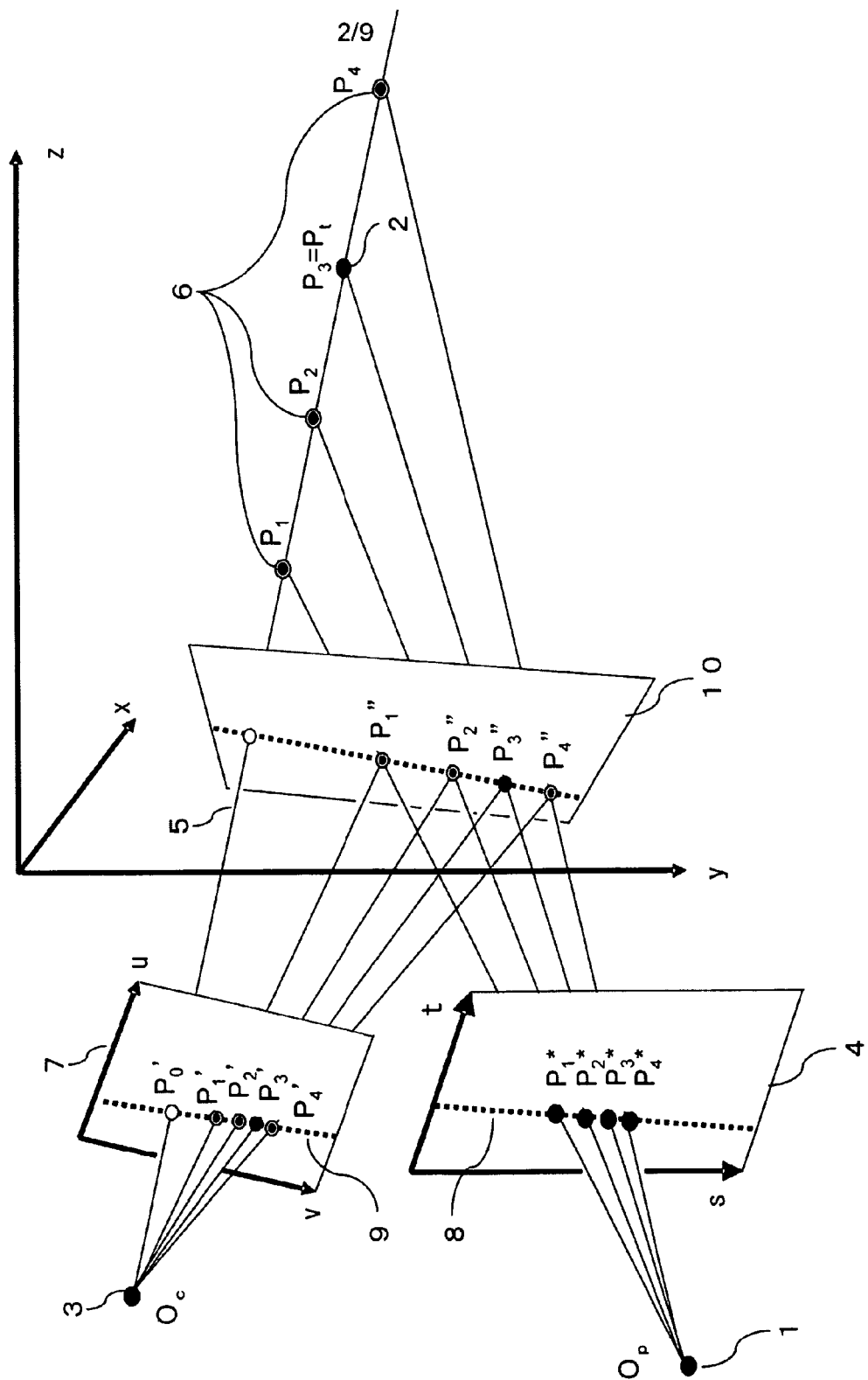
FIG. 2 is a schematic view for illustrating a geometrical model for three-dimensional shape measurement with attendant plane measurement for phase error correction.

FIG. 2 shows a geometrical model of three-dimensional shape measurement with attendant measurement of a plane used for phase error correction, referred to below as the 'reference plane'.

A reference plane 10 is placed at a position in the space. Let points of intersection with the reference plane 10 of light of pattern projection at four points $\{P_i\}$ on the camera line of sight 5 be $\{P_i''\}$, where i is 1 to 4. The set of the points $\{P_i''\}$ is on an epipolar plane including the camera line of sight 5 and the projector center 1 ($O_P$). Also, let points on the camera image 7 corresponding to the points $P_i''$ be $P_i'$. Since the points $\{P_i'\}$ are on an epipolar plane including the camera line of sight 5 and the projector center 1 ($O_P$), the points $\{P_i'\}$ are on an epipolar line 9 on the camera image 7 with respect to the projector. Moreover, when the reference plane 10 is measured, the points $P_i''$ may be observed at the pixels $P_i'$. Hence, the same phases as those of the points $P_i$ may be observed at the pixels $P_i'$. Thus, if the phases of the pixels, obtained on measuring the reference plane 10, are labeled a reference plane phase image ψ(u,v), the positions of the points $\{P_i'\}$ on the camera image 7 may be determined by searching, on the epipolar line 9, those points the phases ψ of which are equal to the phases $φ_i$ of the points $P_i$. The positions of the points $P_i'$ on the camera image 7 should be searched after correcting the distortions of the camera lens or the aspect ratio of the image pickup element.

Since the points $\{P_i'\}$ are perspective-projection of the points $\{P_i''\}$, and the points $\{P_i''\}$ are perspective-projection of the points $\{P_i\}$, the cross ratio of the distances among the points $\{P_i'\}$ is equal to the cross ratio of the depth distances among the points $\{P_i\}$. Thus, let the depth coordinates be $\{z_i\}$ and the phases be $\{φ_i\}$ of the points $\{P_i\}$, the following equation:

$$R(\{P_i'\}) = R(\{z_i\}) \quad (6)$$

holds.

Thus, if the phases $φ_i$ and the depth coordinates zi are known for three out of four points {Pi} of the set of reference points 6, the depth coordinate z of the target point to be measured may be determined from the equation (6) by measuring the phase $φ_t$ of the remaining one point, that is, the target point of measurement, and by searching the position(s) of the points {Pi'}.

In the above-described processing, it is not presupposed that the phase φ to be measured is proportional to the position s on the projector grating. Since the phase image ψ(u,v) on the reference plane 10 is used to correct the relationship between the distance and the phase to be measured, it is possible to correct errors of the projection pattern to measure the three-dimensional shape at high accuracy.

With the above-described technique that uses the reference plane 10, it is necessary to determine the epipolar line 9 on the camera image 7. However, the operation of estimating the epipole or inner projector parameters is labor-consuming. Moreover, if an inexpensive apparatus is used as a projector for pattern projection, the pattern projection may not be conducted properly, so that the estimation may not be feasible. The present exemplary embodiment thus proposes a technique for three-dimensional shape measurement in which it is unnecessary to determine the epipolar line 9.

Figure 3:
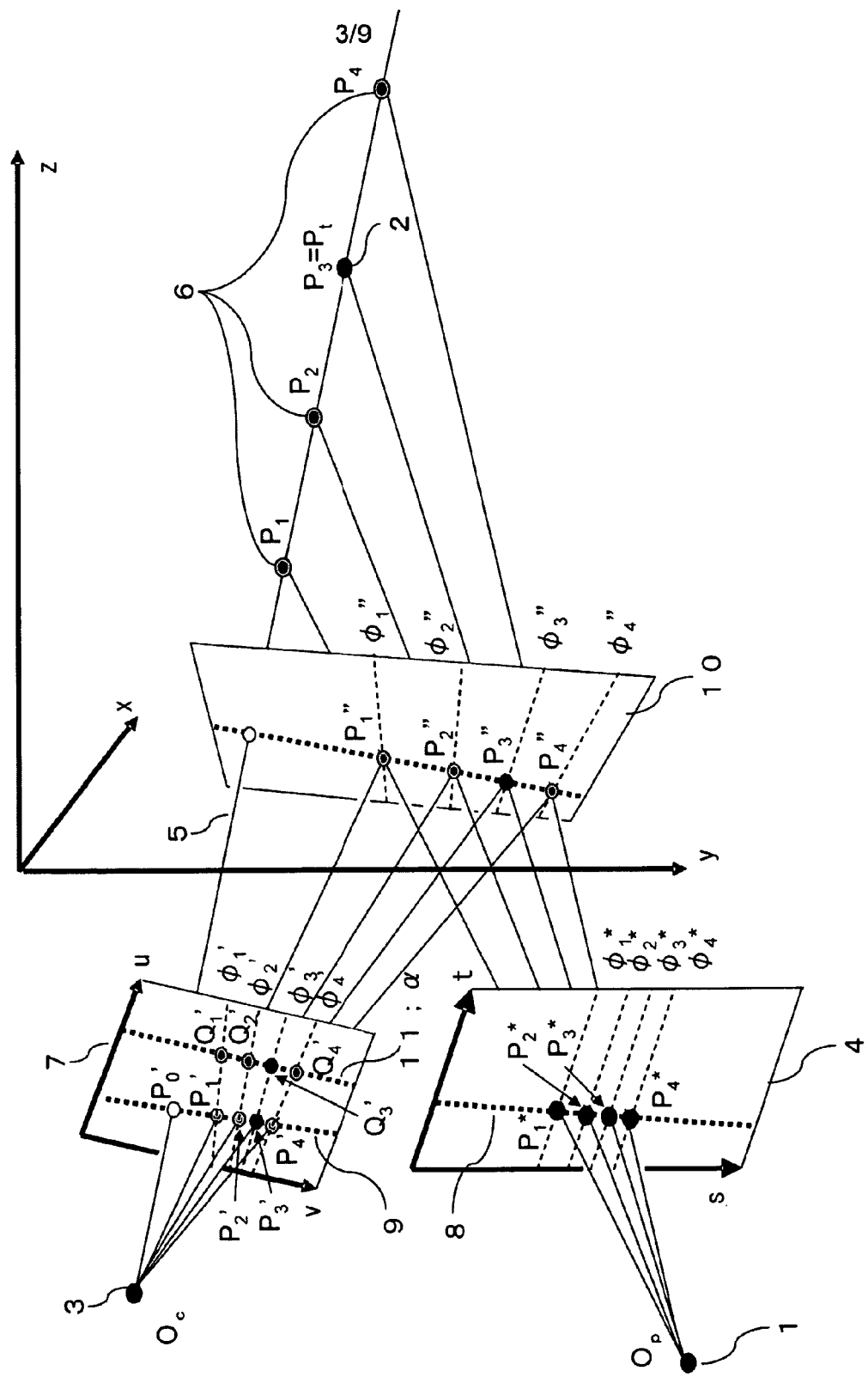
FIG. 3 is a schematic view for illustrating a geometrical model for three-dimensional shape measurement that uses phase error correction not in need of determining an epipolar line.

FIG. 3 depicts a schematic view for illustrating the geometrical model for three-dimensional shape measurement employing phase error correction and in which it is unnecessary to determine the epipolar line 9.

It is presupposed that points of projection of equal phases φ on the projector grating 4 are distributed on a plurality of straight lines, and that the respective straight lines run parallel to one another or intersect one another at a single point. These straight lines are termed equiphase lines. FIG. 3 shows how a pattern having the phase $φ_i$ is projected onto spots of light passing on the equiphase lines $φ_i$*. It is also presupposed that the equiphase lines $φ_i$* intersect one another at a single point, or run parallel to one another. Such presupposition, especially the presupposition that the equi-phase lines run parallel to one another, is valid in case of projection of a pattern in which the phase varies along the s-axis and remains constant along the t-axis.

The phase distribution as seen on the reference plane 10 is now considered. The phase distribution, as measured on the reference plane 10, is the perspective-projection of the phase distribution on the projector grating 4. Hence, a set of points on the reference plane 10, the phases of which being measured are $φ_i$, represents a set of straight lines $φ_i''$ that is a perspective-projection of the set of straight lines $φ_i$*. Like the straight lines $φ_i$*, the straight lines $φ_i''$ form a set of straight lines that intersect one another at a single point or run parallel to one another.

The phase distribution on the camera image 7, looking towards the reference plane 10, is the perspective-projection of the phase distribution on the reference plane 10 with respect to the camera center 3 ($O_C$). Thus, the pixels, whose phases on the camera image 7 are $φ_i$, are on straight lines $\{φ_i'\}$ which are the perspective-projection of the straight lines $φ_i''$.

The straight lines $\{\phi_i'\}$ then also form a set of straight lines that run parallel to one another or that intersect one another at a single point.

It is seen from above that, if points lying on an arbitrary straight line $\alpha 11$ on the camera image 7, and having the phases equal to those of the points $\{P_i'\}$ on the epipolar line 9, are $\{Q_i'\}$, the sets of the equiphase straight lines $\{P_i'Q_i'\}$ run parallel to one another or intersect one another at a single point. Thus, the cross ratio of the distances among the points $\{Q_i'\}$ is equal to the cross ratio of the distances among the points $\{P_i'\}$.

Thus, if the depth coordinates and the phases under measurement of the points $\{P_i\}$ are $\{z_i\}$ and $\{\phi_i\}$, respectively, the following equation:

$$R(\{Q_i'\})=R\{(z_i)\} \quad (7)$$

holds. That is, if the phases $\phi_i$ and the depth coordinates $z_i$ of three of the four points $\{P_i\}$ (set of reference points) are known, the depth coordinate $\{z_t\}$ of $P_t$ may be determined from the equation (7) by measuring the phase $\phi_t$ of the target point 2 ($P_t$) and by searching the position of the point $\{Q_i'\}$.

Since the epipolar line 9 need not be known in the course of this process, it is unnecessary to calibrate the geometrical model of the projector. Moreover, the presupposition that the phase under measurement is proportional to the position s on the projector grating 4 is not used. That is, the relationship between the distance and the phase measured is corrected using phase data on the reference plane 10. Hence, three-dimensional shape measurement may be made at high precision by correcting errors in the projection pattern.

The present exemplary embodiment also proposes a technique of reducing the phase data volume of the reference plane, referred to at the time of search of the above points $\{Q_i'\}$, and a technique for three-dimensional shape measurement with which it is possible to dispense with the measurement of the reference plane 10.

Figure 4:
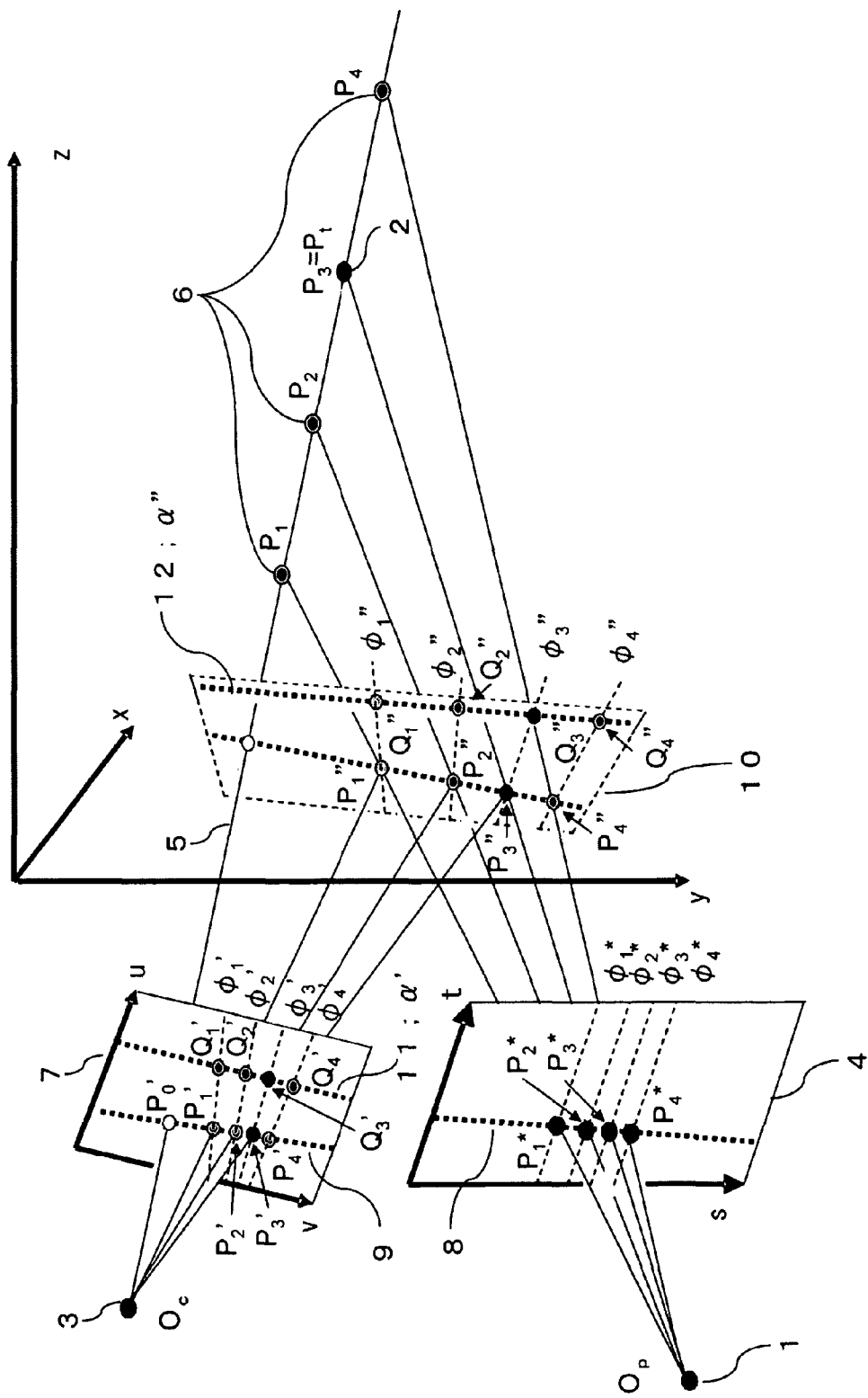
FIG. 4 is a schematic view for illustrating a geometrical model for three-dimensional shape measurement not in need of measuring a reference plane phase image.

FIG. 4 depicts a schematic view for illustrating the geometrical model of the technique for three-dimensional shape measurement with which it is possible to dispense with the measurement of the reference plane 10.

If, in the technique in which measurement of the epipolar line may be dispensed with, measurement is made of an arbitrary pixel, and the processing for searching the image projection points $\{Q_i'\}$ is made on the same straight line $\alpha$ at all times, reference is made to only the values of the pixels on the straight line $\alpha 11$ as the reference plane phase image $\psi$. It is thus sufficient that only the phases on a reference line $\alpha''12$ are measured for the phase image on the reference plane 10 beforehand, while it is unnecessary to measure the reference plane 10 in its entirety. It is thus sufficient to measure only the reference line $\alpha''12$ beforehand in place of the reference plane 10.

FIG. 4 shows points $\{Q_i''\}$ on the reference plane 10, as observed at the image projection points $\{Q_i'\}$, and the reference line $\alpha''12$ on the reference plane 10 observed as the straight line $\alpha 11$ on which search is made. The phases needed as the reference plane phase image $\psi$ are only the phases measured on the reference line $\alpha''12$. Thus, in FIG. 4, the reference line $\alpha''12$ may be substituted for the reference plane 10.

Moreover, if, in measuring the target object, an arbitrary straight line is simultaneously measured, the phases measured on this straight line may be substituted for the phase image $\psi$ on the reference plane 10. Thus, measurement of the reference plane 10 again may become unnecessary in such case. In addition, if, in case a linear portion exists on a surface of a target object, or a linear object has been measured simultaneously with the target object, such linear area can be determined in the image, the phase of the linear area may be substituted for the phase image of the reference plane $\psi$.

EXAMPLE 1

Several Examples of the present invention will now be described with reference to the drawings.

Figure 5:
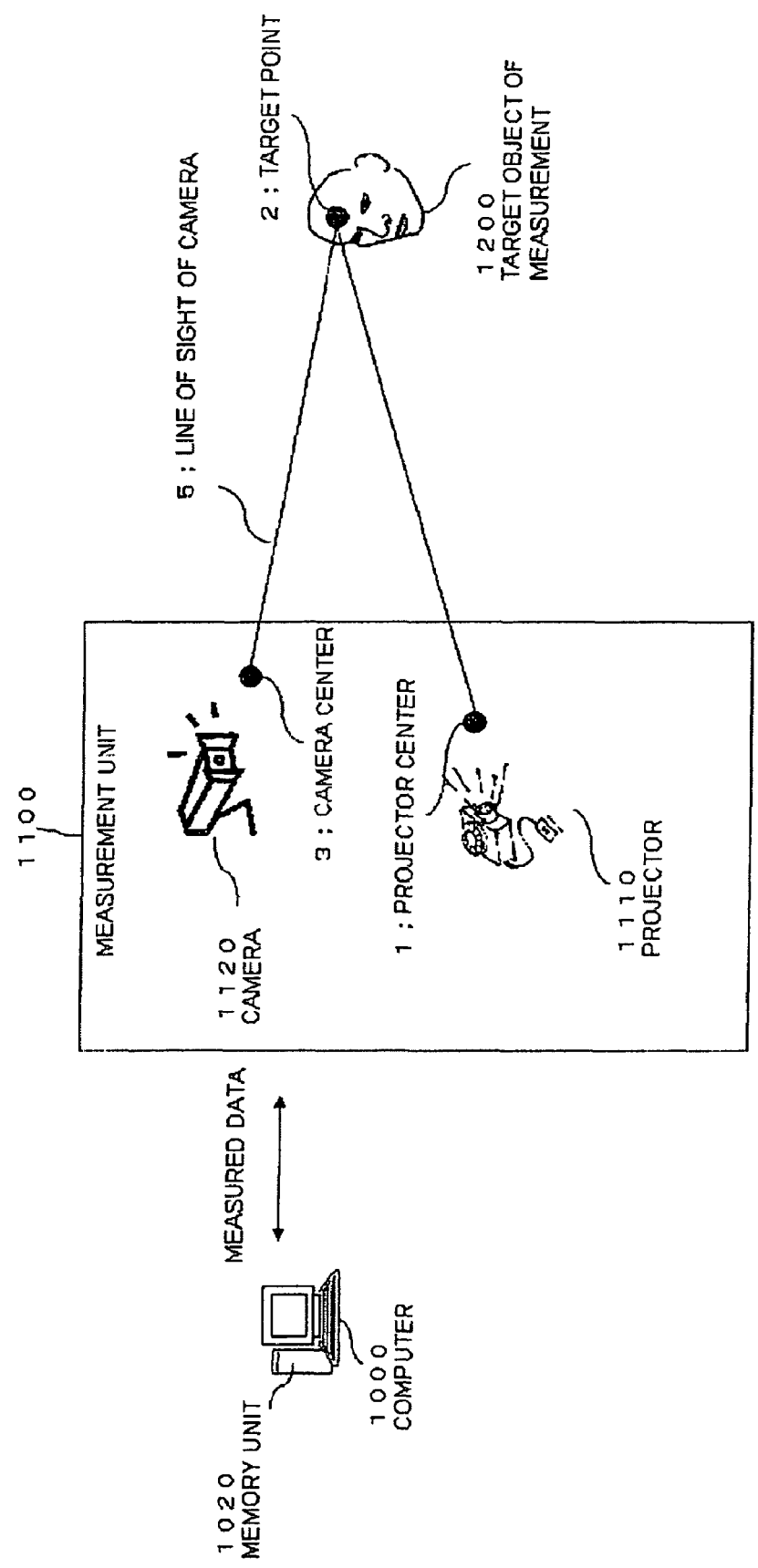
FIG. 5 is a block diagram showing a formulation of Examples 1 to 4 of the present invention.

Referring to FIG. 5, a three-dimensional shape measurement apparatus of Example 1 of the present invention includes a computer (CPU, processor or data processing unit) 1000, operating under program control, and a measurement unit 1100. The measurement unit 1100 includes a projector 1110 and a camera 1120, and projects a light pattern on a target object for measurement 1200, while measuring the light pattern. A variety of techniques may be used to measure the phases For example, the techniques disclosed in U.S. Pat. No. 3,417,377 entitled 'Method, Apparatus and Recording Medium for three-dimensional Shape Measurement' may be used. Also, a variety of patterns for projection may be used depending on the particular techniques for measurement. In any of these measurement techniques, it is the value equivalent to the position of a point or line of intersection of a line or plane of projection to a target point of measurement with a projector image plane that is determined. The value thus determined may be deemed to be the phase. A plurality of projectors and/or cameras may also be used in combination, depending on the techniques for measurement used.

The measurement unit 1100 may be a unit for measurement that also performs real pattern projection. Or, the measurement unit 1100 may be a unit for reading-in image data of the measured results from outside, such as from a recording medium, to effect phase calculations, or a unit for reading-in the phases as data from outside.

In the following, the coordinate system for measurement has coordinate axes x, y and z. Of these, the axis that includes the smallest angle with the depth direction as seen from the camera is labeled a z-axis. The camera center 3 operates as the point of origin of the z-axis, and the point of the z-coordinate as measured from the point of origin is the depth distance.

Figure 6:
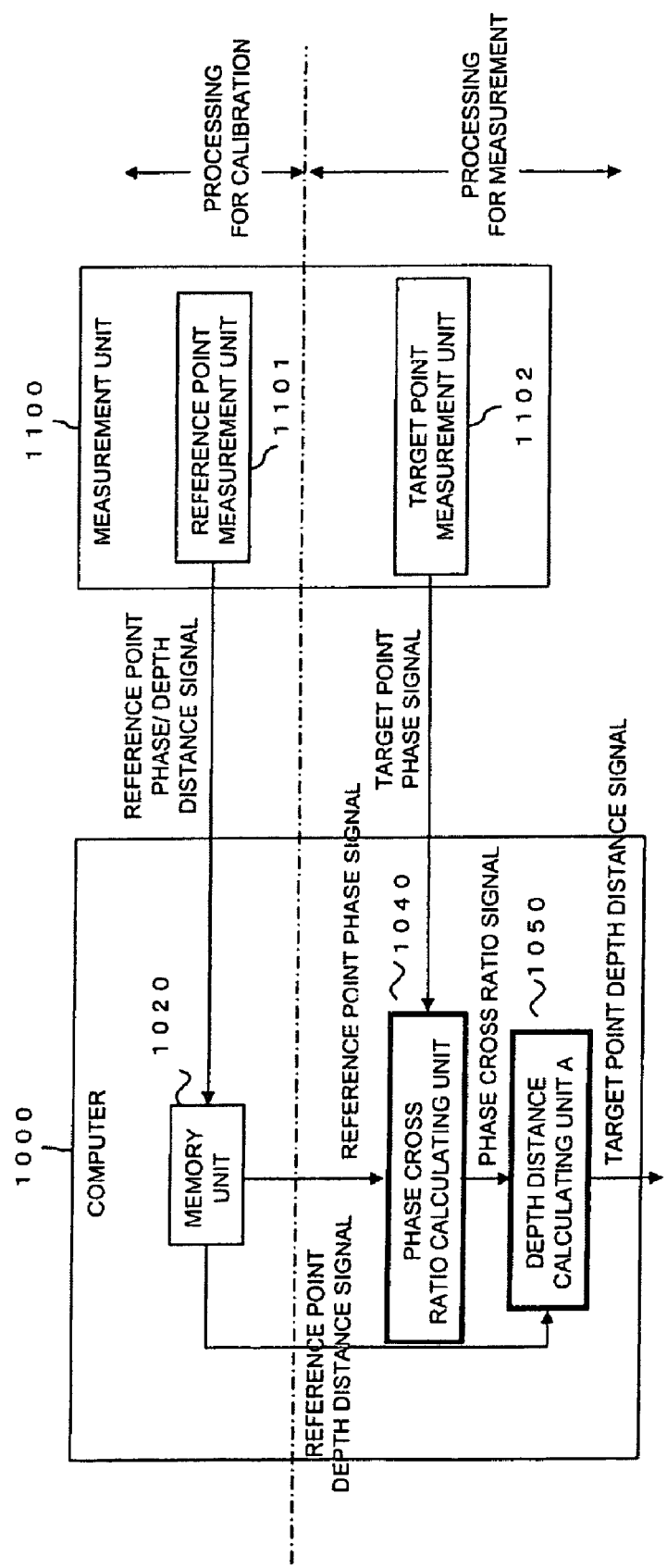
FIG. 6 is a block diagram showing a formulation of an Example 1 of the present invention.

FIG. 6 depicts a block diagram of an Example 1 of the present invention. Referring to FIG. 6, the computer 1000 includes a memory unit 1020, a phase cross ratio computing unit 1040, and a depth distance calculating unit A 1050. The measurement unit 1100 includes a reference point measurement unit 1101 and a target point measurement unit 1102.

These unit operate as follows:

Initially, reference data needed to calculate the three-dimensional shape of a target object of measurement are acquired (processing for calibration). The processing for calibration may be carried out in advance of or simultaneously with the processing for measurement of the target object. It is necessary to carry out the processing for calibration only once, such that the processing does not have to be repeated unless the construction of the measurement unit 1100 has been changed.

The reference point measurement unit 1101 measures, by the measurement unit 1100, the phases of a set of reference points 6 for an arbitrary pixel (u,v), the three-dimensional shape of which is desired to be measured. The set of reference points 6 includes three or more points and is located at a depth position $z=z_i^r$ (i=1, 2, . . . ) on a line of sight of the camera 5 for the pixel. The phases thus measured are labeled reference point phases $\phi_i^r(u,v)$. The set of the reference points, lying at respective positions, is labeled a set of reference points 6 $\{P_i\}$. By way of a simple implementing method, a planar object is provided and set at a position $z=z_i^r$ at right angles to the z-axis of the measurement coordinate system to carry out measurement using the projector 1110 and the camera 1120. If the phases of the respective pixels are measured by the camera 1120 and labeled $\phi_i^r(u,v)$, the phases and the depth distances of the reference points for the arbitrary pixels (u,v) may efficiently be obtained at a time. It is noted however that there are also other methods for measurement of the phases and depth distances of the reference points than that described above. The target object of measurement, used for measuring the reference data, is not limited to a planar object. It is sufficient to get set of values of any phase and depth distance for three or more points. To this end, a variety of different methods or techniques may be used. The reference point measurement unit 1101 may be a unit for doing pattern projection and measurement and, as described above, may also be a unit for reading-in image data and depth distances of patterns of measured results from outside, such as from recording mediums, and for calculating the phases. It may also be a unit for reading-in the phases as well as depth distances as data from outside.

The memory unit 1020 holds the phases $\phi_i^r$ and the depth distances $z_i^r$ of the reference points. Or, the memory unit 1020 may not be used, in which case the phases or depth distances may be read-in as data from outside as necessary.

Calculation is then made of the depth distance of the target point 2, using the phases as measured for the target point 2 and the data of the reference points (processing for measurement).

The target point measurement unit 1102 measures the phase of the target object 1200 by the measurement unit 1100. The phase of the target object 2, as measured for the pixel (u,v) of the camera 1120, is labeled $\phi$. The target point measurement unit 1102 may be a unit for actually doing pattern projection and measurement. However, it may be unit for reading-in image data of the pattern of measured results from outside, such as from a recording medium, or unit for reading-in phase data from outside.

The phase cross ratio computing unit 1040 calculates the cross ratio $R(\{\phi^s\}, \phi_t)$ of the phases of the set of the reference points $\{P_i\}$ and the target point $P_t$. The phases $(\phi_i^r)$ of the three reference points and the phase $\phi_t$ of the target point $P_t$, arrayed in the increasing order, are labeled $(\phi_i^o)$. For example, if $\phi_1^r<\phi_2^r<\phi_t<\phi_3^r$, $\phi_1^o=\phi_1^r$, $\phi_2^o=\phi_2^r$, $\phi_3^o=\phi_t$ and $\phi_4^o=\phi_3^r$. The phase cross ratio $R(\{\phi_i^o\})$ is calculated by the following equation:

$$R(\{\phi_i^o\})=(\phi_3^o-\phi_1^o)(\phi_4^o-\phi_2^o)/(\phi_3^o-\phi_2^o)(\phi_4^o-\phi_1^o) \qquad (8)$$

If four or more reference points have been obtained, three suitable points are selected. The method of selection may be such a method of selecting three points having phases closest to the phase $\phi_t$ as reference points.

In case an estimated value of the depth distance of the target point $P_t$ has separately been obtained, reference may be made to this depth distance to select the points having closer depth distances as the reference points. By getting the phases and depth distances of the reference points at as many positions in the range of measurement as possible in the calibration process, it becomes possible to suppress adverse effects of errors, such as projection pattern errors, to effect measurement at high accuracy.

The depth distance calculating unit A 1050 finds the depth distance $z_t$ of the target point of measurement $P_t$ based on the equality of the cross ratio of the depth distances among the reference points $\{P_i\}$ and the target point of measurement $P_t$ to the phase cross ratio as mentioned above. The depth distances of the reference points are labeled $\{z_i^r\}$. Assume that, in case the phases and the depth distances of the reference points are re-arrayed in the order of increasing magnitudes, the order of the depth distances of the corresponding points be the index sequence of $\{z_i^o\}$. For example, if $\phi_1^r<\phi_2^r<\phi_t<\phi_3^r$, $z_1^o=z_1^r$, $z_2^o=z_2^r$, $z_3^o=z_t$ and $z_4^o=z_3^r$ hold.

Then, the following equation:

$$R(\{z_1^o\})=R(\{\phi_1^o\}) \qquad (9)$$

holds.

It is noted that $$R(\{z_i^o\})=(z_3^o-z_1^o)(z_4^o-z_2^o)/(z_3^o-z_2^o)(z_4^o-z_1^o)$$

now holds. That is, from the equation (9), the following equation:

$$(z_3^o-z_1^o)(z_4^o-z_2^o)=R(\{\phi_1^o\})(z_3^o-z_2^o)(z_4^o-z_1^o) \qquad (10)$$

holds. By solving this equation for $z_3^o$ ($=z_t$), the depth distance $z_t$ of the target point may be found by the following equation:

$$z_3^o=[(z_4^o-z_2^o)-R(z_4^o-z_1^o)]^{-1}[z_1^o(z_4^o-z_2^o)-Rz_2^o(z_4^o-z_1^o)]$$

With the three-dimensional shape measurement apparatus, operating as described above, the depth distance of the target point 2 can directly be measured from the measured phase of the target point 2, without recourse to the geometrical model parameters of the projector. Hence, the present Example provides a three-dimensional shape measurement apparatus in which there is no necessity to calibrate the geometrical model of the projector.

EXAMPLE 2

Figure 7:
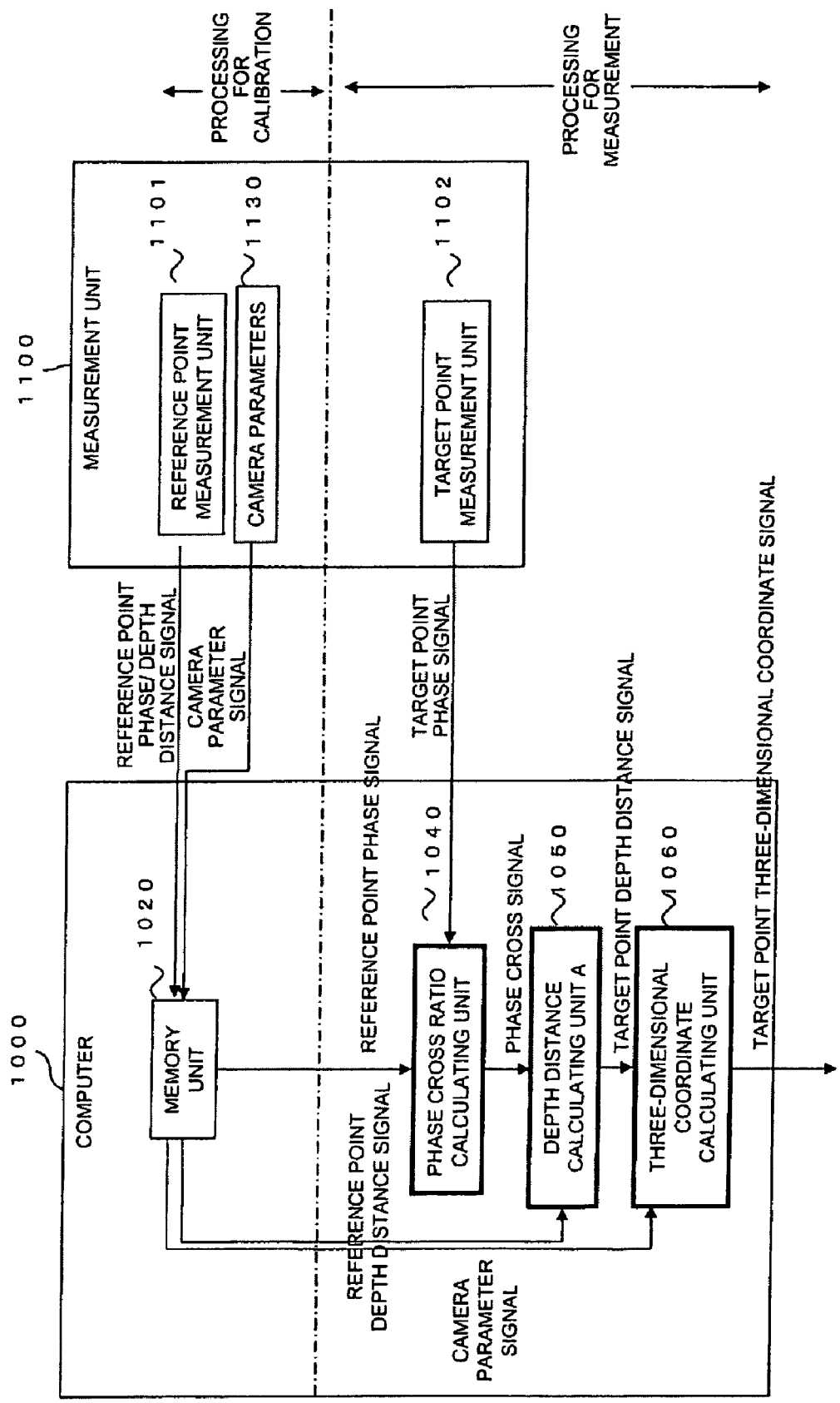
FIG. 7 is a block diagram showing a formulation of an Example 2 of the present invention.

Referring to FIG. 5, a three-dimensional shape measurement apparatus of an Example 2 of the present invention comprises a computer 1000, operating under program control, and a measurement unit 1100. Referring further to FIG. 7, the computer 1000 comprises a memory unit 1020, a phase cross ratio calculating unit 1040, a depth distance calculating unit A 1050, and a three-dimensional coordinate calculating unit 1060.

The measurement unit 1100 includes a reference point measurement unit 1101, a target point measurement unit 1102 and camera parameters 1130.

These units operate as follows:

First, reference data needed for calculating the three-dimensional shape of an object for measurement are acquired (processing calibration).

The operation of the reference point measurement unit 1101 is the same as that of Example 1 described above.

Further, the position and the orientation of the camera relative to the measurement coordinate system as well as the focal length and inner parameters of the camera (referred to below as camera parameters 1130) are found at the outset as parameters that describe the geometrical model of the camera 1120. The camera parameters 1130 may be provided on the measurement unit 1100, too. Various techniques may be used to acquire the camera parameters. For example, the technique shown in a Publication "A versatile Camera Calibration Technique for High-Accuracy 3D Machine Vision Metrology Using Off-the-Shelf TV Cameras and Lenses", Roger Y. Tsai, IEEE Journal of Robotics and Automation, Vol. RA-3, No. 4, August 1987, pages 323-344, for instance, may be used.

The memory unit 1020 saves the above-mentioned camera parameters, and the above-mentioned phases $\{\phi_i^r\}$ as well as the depth distances $\{z_i^r\}$ of the reference points.

The depth distance $z_t$ of the target point $P_t$ is then calculated using the phase $\phi_t$ as measured for the target point, the aforementioned phases of the reference points and the aforementioned depth distances of the reference points (measurement processing).

The operation of the target point measurement unit 1102, phase cross ratio calculating unit 1040 and the depth distance calculating unit A 1050 is the same as that of Example 1 described above.

The three-dimensional coordinate calculating unit 1060 reads-in the camera parameters 1130 and calculates an equation of a line of sight of the camera (5 of FIG. 1, for example) corresponding to a pixel of the coordinate (u,v) in a three-dimensional space, based on the geometrical model of the camera. The line of sight of the camera 5 may be determined as a straight line passing through the camera center 3 ($O_C$) and the pixel position ($P_0'$) corresponding to the point to be measured (see FIG. 1).

Further, the three-dimensional coordinates of a point, located on the line of sight of the camera 5, and the z-coordinate of which is equal to the depth coordinate $z_t$ output from the depth distance calculating unit A 1050, are then calculated from the above equation of the line of sight of the camera 5. The above processing enables the three-dimensional coordinates ($x_t$, $y_t$, $z_t$) of the target point $P_t$ to be measured. By repeating the above processing, it is possible to find the three-dimensional coordinates of the target point of measurement for all the pixels that are as objects for measurement, to measure the three-dimensional shape of the target object 1200.

By the above processing, the three-dimensional coordinates ($x_t$, $y_t$, $z_t$) of the target point $P_t$ may be calculated directly without using the geometrical model parameter(s) of the projector 1110. Hence, the three-dimensional shape measurement apparatus not in need of calibration of the projector's geometrical model may be provided by the present invention.

EXAMPLE 3

Figure 8:
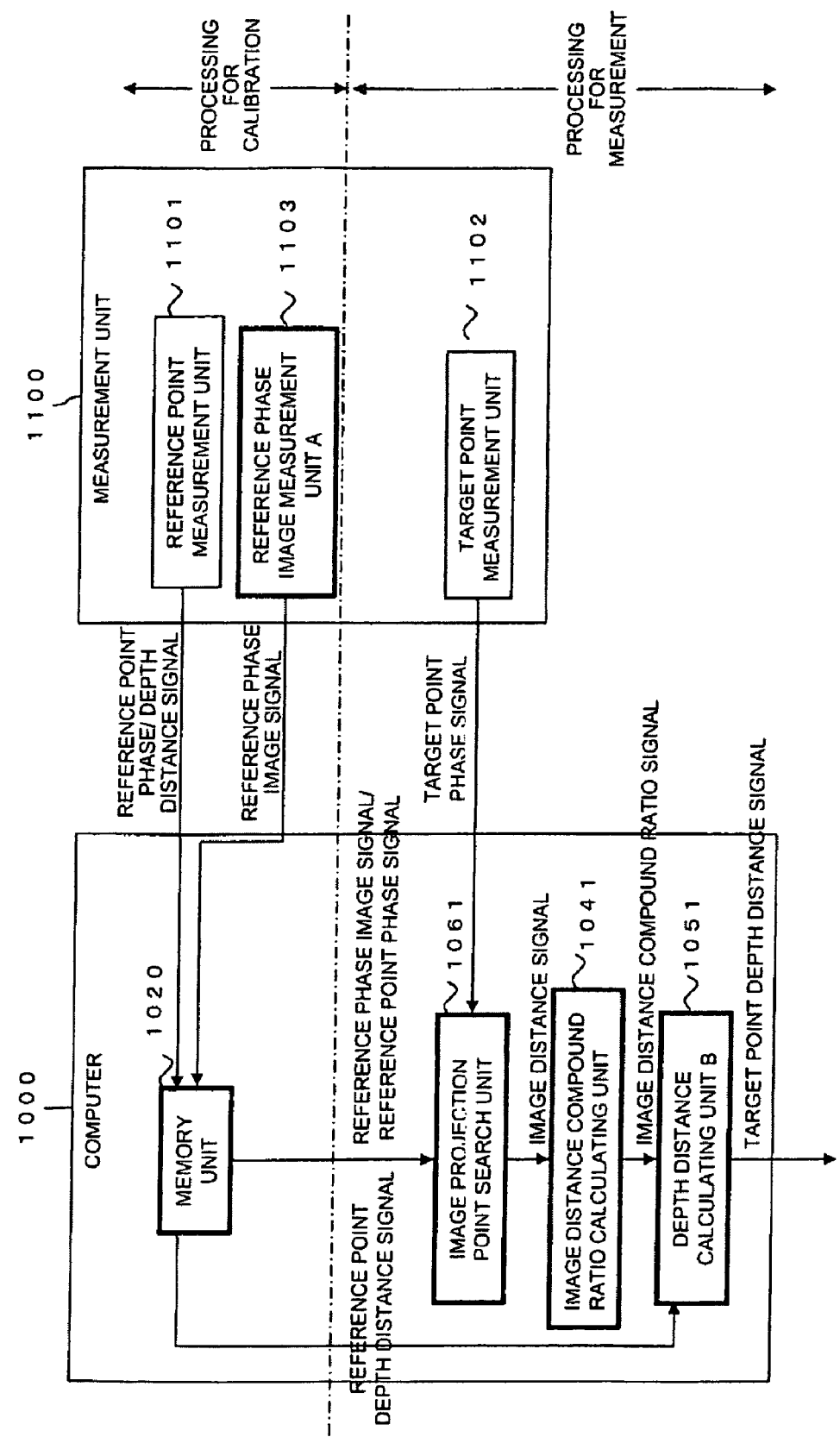
FIG. 8 is a block diagram showing a formulation of an Example 3 of the present invention.

Referring to FIG. 5, a three-dimensional shape measurement apparatus of Example 3 of the present invention comprises a computer 1000, operating under program control, and a measurement unit 1100. Referring to FIG. 8 further, the computer 100 also comprises an image projection point search unit 1061 and an image distance cross ratio calculating unit 1041 in addition to a memory unit 1020 and a depth distance measurement unit B 1051. The measurement unit 1100 further includes a reference phase image measurement unit A 1103 in addition to a reference point measurement unit 1101 and a target point measurement unit 1102.

The above units operate as follows:

First, reference data needed to carry out three-dimensional shape calculations of a target object for measurement 1200 are acquired (processing for calibrations). This processing for calibrations may be carried out in advance of or simultaneously with measuring the target object. This processing for calibration needs to be carried out only once such that it does not have to be carried out again unless the structure of the measurement unit 1100 is changed. It is possible to have a plane or a straight line included in the measurement range and to measure them at the same time as the target object is measured. By so doing, the reference plane phase image, which will be described subsequently, may be obtained simultaneously with measurement of the target object.

The measurement unit 1100 of the reference point measurement unit 1101 measures the phases of three or more reference points lying at depth positions $z=z_i$ (i=1, 2, ... ) on the line of sight of the camera 5 with respect to a pixel (u,v) the three-dimensional shape of which is desired to be measured. The phases thus found and the depth distances are labeled $\{\phi_i^r(u,v)\}$ and $\{z_i^r(u,v)\}$, respectively.

A variety of methods may be used for obtaining sets of the phases and the depth distances, referred to below as 'reference data'. As a simple method, a planar surface may be set at a position $z=z_i^r$ at right angles to the z-axis of the measurement coordinate axis, and measurement is made using the projector 1110 and the camera 1120. This method is efficient in that reference data of the totality of pixels (u,v) on the planar surface, seen by the camera 1120, may be obtained at a time. However, there are a variety of other methods that may be used for measuring the reference phases and reference depth distances. The target object 1200 used for measuring the reference data is not limited to the planar surface. It is sufficient if sets of the reference depth coordinates and the reference phases may be obtained for each of the pixels (u,v) being measured.

The reference point measurement unit 1101 may be a unit for doing real pattern projection and measurement, as described above. It may also be a unit for reading-in depth distances and image data for the measured results of the pattern from outside, such as from a recording medium, or a unit for reading-in the reference data from outside.

The reference phase image measurement unit A 1103 measures a planar surface or a straight line provided (prepared) as a target object. Such planar surface or the straight line is set at one or each of a plurality of positions and orientations appropriate for measurement. The totality of phases, as measured for the respective pixels of the camera image of the camera 1120, are labeled reference plane phase images $\psi_j(u,v)$, j being a number that identifies a setting position (j=1, 2, ... ). The planar surface or the straight line is to be set at an arbitrary position and at an arbitrary orientation that is not parallel to the direction of phase changes of the pattern. For example, the planar surface or the straight line may be set at right angles to the observing direction by the camera 1120 or to the projection direction of the projector 1110. The favorable effect of the present invention may be demonstrated with a single setting position. However, the more the number of the setting positions and the more the number of measurement points, the higher becomes the measurement accuracy. In case the reference point measurement unit 1101 has measured the reference phase $\{\phi_i^r\}$ using the planar surface or the straight line, $\{\phi_i^r(u,v)\}$ may directly be substituted for the reference phase image $\psi_j(u,v)$, in which case it is unnecessary to measure the reference plane phase image anew.

The memory unit 1020 stores the reference point phases, reference point depth distances $\{\phi_i^r \text{ and } z_1^r\}$ (i=1, 2, ... ) and the reference plane phase images $\psi_j(u,v)$, (j=1, 2, ... ). Data may also be read-in from outside in place of using the memory unit 1020.

The depth distance of the target point is then calculated from measured phases of the object, using the above-mentioned reference data set (processing for measurement).

The target point measurement unit 1102 is the same as that of the first arrangement, and measures the phase φ(u,v) of the point of the target object to be measured for the pixel (u,v). The target point measurement unit 1102 may also read-in measured results from outside.

An image projection point search unit 1061 first determines an epipolar line of the pixel under measurement (u,v) with respect to the projector 1110. In case the geometrical model of the projector 1110 has not been calibrated, it is not possible to determine the epipolar line 9. If the equiphase points of the pattern on the projection plane of the projector may be presupposed to be distributed on a plurality of straight lines that run parallel to one another or that intersect one another at a single point, an arbitrary straight line 11(α) not at right angles to the epipolar line 9 may be used in place of the epipolar line, as previously mentioned. Even if the above presupposition fails to hold, the straight line 11(α) may be set as a straight line having a direction close to that of the epipolar line 9, in which case the favorable effect of the present exemplary embodiment may still be maintained. There are a variety of methods for determining the straight line 11(α). For example, if the position of the center of the projector 1100 is close to the v-direction, a straight line passing through the pixel (u,v) and extending parallel to the v-axis may be used. If this technique is used, the straight line extends along a string of the pixels, thus simplifying the search processing carried out next. Another technique is to select the same straight line α11 at all times regardless of which pixel is being measured. Since only values of the reference phase image lying on the preset straight line α11 among the reference phase images are referred to in this case, it is unnecessary to measure the phases other than those lying on the straight line as the reference phase image. Hence, the reference plane 10 may be a straight line, as explained in connection with the operation of the reference phase image measurement unit A 1103.

The pixels on the straight line α11, the reference phases ψ of which are equal to the reference point phases $\{\phi_i^r(u,v)\}$ (i=1, 2, . . . ) and the target point phase φ(u,v), are then searched. These searched points are labeled image projection points $P_k'$ (k=1, 2, 3, 4) in the order they are arrayed on the straight line. It is now assumed that $P_t'$ be a point with a phase equal to a phase of the target point φ(u,v). The position of a point of image projection on the straight line α11 with respect to a point of origin, which may be set at an arbitrary point on the straight line α11, such as a point $P_1$, is found. The distance between this point of origin and the position of the image projection point is output as an image distance $\{d_k\}$.

As the coordinates of the images in the above processing, the coordinate values, corrected for the camera lens distortions or the aspect ratio of the image pickup devices, are used. Such correction is unnecessary if lens distortions or the aspect ratio are negligible.

If a plurality of reference phase images are usable, proper reference phase images are selectively used. As an example, the reference phase image as measured at a position of a closest depth distance to the target point may be selected. Even if the three-dimensional coordinate of the target point is unknown, such a reference phase image, the phase of the pixel (u,v) of which is closest to the phase φ as measured, may be selected. With the use of this method, it is possible to suppress an error factor varied with the depth distance, such as blurring of the projector 1110 or the camera 1120, thus assuring high accuracy measurement. Such a reference phase image may be selected in which the search for the image projection point does not deviate to outside the image. These techniques are given only by way of illustration such that many other suitable methods may also be used.

In case the set of four or more reference points 6 is usable, three most proper points of them are selected. Among the methods for selection, there is such a method of selecting three points closer to the target point 2. While the depth distance of the target point 2 is unknown, the set of three reference points, the phases of which are closest to the phase φ of the target point 2, may be selected. Various methods other than these may, of course, be used for selection.

By finding the reference point phases and the reference point depth distances in the course of the processing for calibration, at as many points within the range of measurement as possible, and by selecting proper reference data, it becomes possible to suppress the adverse effect of errors, such as blurred projection pattern. This enables the depth distance of the target point to be measured to high accuracy.

The image distance cross ratio calculating unit 1041 calculates the image distance cross ratio $R_{img}$ for the image projection points $\{P_i'\}$ of the reference points and the image projection point P' of the target point by the following equation:

$$R_{img}=(d_3-d_1)(d_4-d_2)/(d_3-d_2)(d_4-d_1) \quad (11)$$

The depth distance measurement unit B 1051 calculates the depth distance z of the target point 2 (P) by exploiting the equality of the cross ratio $R_z$ among the depth distances of the set of the reference points 6 $\{P_i\}$ and the depth distance of the reference point 2 to the image distance cross ratio $R_{img}$. That is, with the reference point depth distances $z_k$ corresponding to the image projection points $P_k'$, the following equation is valid:

$$R_z=(z_3-z_1)(z_4-z_2)/(z_3-z_2)(z_4-z_1)=R_{img} \quad (12)$$

where, if k=t, the reference point depth distance becomes equal to the depth distance of the target point. In the above equation, the values other than $z_t$ are known. The depth distance of the target point 2 may be found by solving the above equation with respect to $z_t$.

Further, if the camera parameters 1130 have become known by camera calibration, as in the above-described Example 2, the three-dimensional coordinate of the target point 2 may be calculated using the aforementioned depth distance and the camera parameters 1130.

By the above processing, it is possible to correct the errors in the phase to be measured, using the reference phase images, which are real measured data, to calculate the depth distance of the target point of measurement from the measured phases without using geometrical model parameters of the projector. It is thus possible with the present Example to provide a three-dimensional shape measurement apparatus of high precision in which an error in the projection pattern may be corrected without the necessity of calibrating the projector's geometrical model.

EXAMPLE 4

Figure 9:
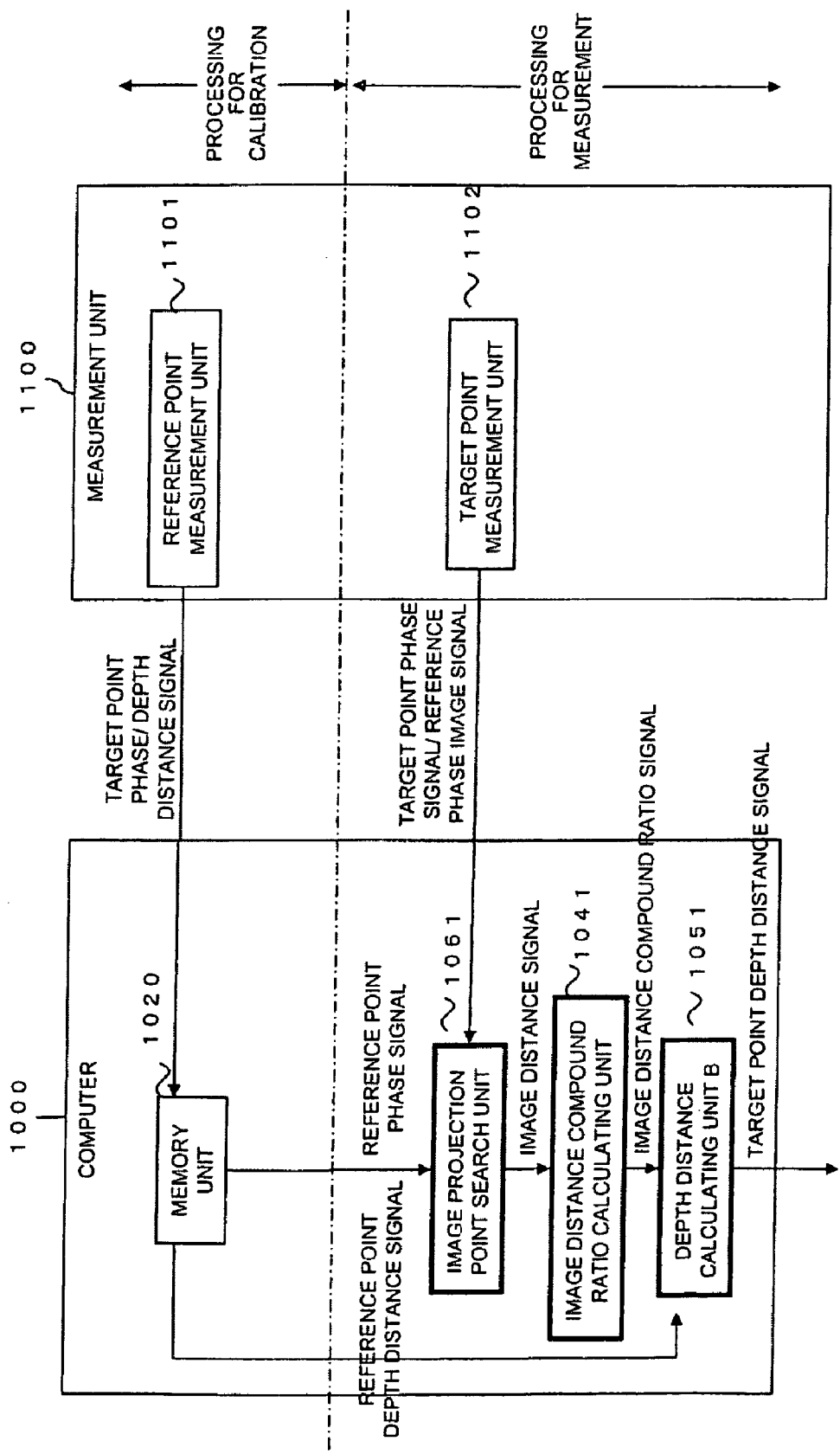
FIG. 9 is a block diagram showing a formulation of an Example 4 of the present invention.

Referring to FIG. 5, a three-dimensional shape measurement apparatus of Example 4 of the present invention comprises a computer 1000, operating under program control, and a measurement unit 1100. Referring to FIG. 9, the present Example differs from Example 3 (FIG. 8) in that the reference phase image measurement unit A 1103 is not provided and in that the image projection point search unit 1061 refers to the reference phase image obtained by the target point measurement unit 1102 in the course of processing for measurement.

The above units operate as follows:

First, reference data needed to carry out three-dimensional shape calculations of the target object 1200 are acquired (processing for calibrations). This processing for calibrations may be carried out in advance of or simultaneously with measuring the target object. This processing for calibration needs to be carried out only once such that it does not have to be carried out again unless the structure of the measurement unit 1100 is changed.

The operations of the reference point measurement unit 1101 are the same as those of Example 3 described above.

The memory unit 1020 stores the reference point phases and the reference point depth distances $\{\phi_i^r, z_i^r\}$, where i=1, 2, . . . . Data may also be read-in from the outside as necessary, in which case the memory unit 1020 may be dispensed with.

Then, from the phases as measured of the target point 2 of the target object 1200, the depth distance of the target point is calculated, using the set of the reference data (processing of measurement).

The target point measurement unit 1102 is the same as that used in Example 3 described above, and measures the phase φ of the pattern projected on the target point. The target point measurement unit 1102 may also read-in the measured result from outside. A reference phase image measurement unit B 1104 simultaneously measures a reference object that has a linear or planar site to get a reference phase image θ.

The image projection point search unit 1061 refers to the reference phase image θ, as a substitution for the aforementioned reference phase image ψ, and determines a straight line within an area where the planar or linear portion of the reference object has been measured. This straight line is to be used for searching image projection points corresponding to the reference points and the target point. The present Example differs from Example 3 only in this respect, and is otherwise the same as Example 3.

The operation of the image distance cross ratio calculating unit 1041 is the same as that of Example 3.

The operation of the depth distance measurement unit B 1051 is also the same as that in Example 3.

If the camera parameters 1130 are already obtained by the camera calibration unit, as in Example 2, the three-dimensional coordinates of the target point 2 may be calculated using the aforementioned depth distance and the camera parameters 1130.

By the above operation, the reference phase image, as measured data for correcting the error of the phase to be measured, may be obtained from the measured phase of the target object. Thus, a three-dimensional shape measurement apparatus may be provided which is capable of high precision measurement with a simplified processing for calibration. Moreover, in case a linear portion or a planar area is contained in the previously measured results of the phases by the three-dimensional shape measurement apparatus, the measured data may be input and the present exemplary embodiment may then be applied to enable highly accurate three-dimensional shape measurement.

INDUSTRIAL APPLICABILITY

The present invention may be applied to measurement of the three-dimensional shape of an object. Moreover, the present invention allows correction of errors in a projection pattern in the three-dimensional shape measurement apparatus to implement measurement to high precision. Further, according to the present invention, the parameters of the geometrical model of the projector do not have to be calibrated to allow reduction in costs in fabrication or maintenance of the apparatus for measurement.

The particular exemplary embodiments or examples of the present invention may be modified or adjusted within the gamut of the entire disclosure of the present invention, inclusive of claims, based on the fundamental technical concept of the invention. Further, variegated combinations or selection of elements disclosed herein may be made within the framework of the claims.

The invention claimed is:

1. A distance measurement apparatus, in which a depth distance down to a target point is measured as a phase is entered to said apparatus as an input, said phase being a quantity representing a change of a pattern projected on a target point whose depth distance is to be measured; said pattern being varied depending on directions of projection from pattern projection unit; said phase being measured by observing a reflection of said pattern; said apparatus comprising:

a phase cross ratio calculating unit that receives a phase of said target point and phases of three reference points lying on a line of light on which said target point has been measured, and for calculating a phase cross ratio to output the phase cross ratio calculated; and a depth distance calculating unit that receives the depth distances of said reference points and said phase cross ratio and calculating the depth distance of said target point by exploiting the equality of said phase cross ratio and a depth distance cross ratio of depth distances among said reference points and said target point.

2. The distance measurement apparatus according to claim 1, further comprising:

a three-dimensional coordinate calculating unit that receives geometrical model parameters regarding the position relative to a measurement coordinate system, orientation and focal length of said pattern projection unit that has observed said pattern, and the depth distance of said target point, and for calculating three-dimensional coordinates of said target point.

3. The distance measurement apparatus according to claim 1, wherein said phase cross ratio calculating unit selects three out of four or more reference points on said line of sight on which said target point has been measured, as proximity points, said three points having phase of values closest to the phase of said target point; said phase cross ratio calculating unit calculating a phase cross ratio of the phases of said proximity points and said target point;

said depth distance calculating unit taking said proximity points as said reference points.

4. A distance measurement apparatus in which a depth distance down to a target point is measured as a phase is entered to said apparatus as an input, said phase being a quantity representing a change of a pattern projected on a target point whose depth distance is to be measured; said pattern being varied depending on directions of projection from pattern projection unit; said phase being measured by observing a reflection of said pattern; said apparatus comprising:

an image projection point search unit that receives a reference phase image which is a phase measured of a linear part of an object, phases and depth distances of three reference points lying on said line of sight on which said target point has been measured, and a phase of said target point; said image projection point search unit searching for positions of image projection points on said reference phase image which are points having phase values coincident with phase of said reference points and said target point; said image projection point search unit calculating distances among said image projection points and outputting the calculated distances as image distances;

an image distance cross ratio calculating unit that receives said image distances, calculating a cross ratio of distances among said image projection points as an image distance cross ratio, and outputting said image distance cross ratio calculated; and a depth distance calculating unit that receives depth distances of said reference points and said image distance cross ratio and for calculating a depth distance of said target point by exploiting the equality of said image distance cross ratio and a depth distance cross ratio of the depth distances among said reference points and said target point.

5. The distance measurement apparatus according to claim 4, wherein said image projection point search unit takes, from a phase image for a plurality of linear portions on a surface of said object, an image containing points equal to phases of said reference points and said target point as said reference phase image.

6. The distance measurement apparatus according to claim 5, wherein said image projection point search unit takes in said reference phase image one of straight lines on an image closest to said target point as a straight search line.

7. The distance measurement apparatus according to claim 5, wherein said image projection point search unit takes in said reference phase image one of straight lines closest to a straight line passing through a point on an image observing said target point and through an epipolar point for said pattern projection unit, as a straight search line.

8. The distance measurement apparatus according to claim 5, wherein said image projection point search unit takes only a phase image on a predetermined straight line as said reference phase image.

9. The distance measurement apparatus according to claim 4, wherein said image projection point search unit extracts, from a phase image for a planar area on a surface of said object, a linear area containing pixels equal to the phases of said reference points and said target point, as a search straight line, and for searching for said image projection points on said search straight line.

10. The distance measurement apparatus according to claim 4, wherein said image projection point search unit decides, from a phase image for a plurality of planar areas, on a linear area containing pixels equal to phases of said reference points and said target point, as a search straight line; said image projection point search unit searching for said image projection points on said search straight line.

11. A distance measurement apparatus, in which a depth distance down to a target point is measured as a phase is entered to said apparatus as input, said phase being a quantity representing a change of a pattern projected on a target point whose depth distance is to be measured; said pattern being varied depending on directions of projection from pattern projection unit; said phase being measured by observing a reflection of said pattern; said apparatus comprising:
an image projection point search unit for taking a phase image measured for a linear area that stands for a three-dimensional shape of a target object for measurement, as a reference phase image, and searching for image projection points on said reference phase image; said image projection points being points having phases coincident with a phase of said target point and with phases of three reference points lying on the line of sight on which said target point has been measured; said image projection point search unit calculating distances among said image projection points and outputting the calculated distances as image distances;
an image distance cross ratio calculating unit that receives said image distances, calculating a cross ratio of distances among said image projection points as an image distance cross ratio, and outputting the image distance cross ratio calculated; and
a depth distance calculating unit that receives the depth distances of said reference points and the image distance cross ratio and for calculating a depth distance of said target point by exploiting the equality of said image distance cross ratio and a depth distance cross ratio of the depth distances among said reference points and said target point.

12. The distance measurement apparatus according to claim 11, wherein said image projection point search unit takes a phase image of a plurality of linear portions on a surface of said object, as a reference phase image; said image projection point search unit extracting, from said reference phase image, an image containing pixels equal to phases of said reference points and said target point, as a search straight line, and searching for said image projection points on said search straight line.

13. The distance measurement apparatus according to claim 11, wherein said image projection point search unit takes a phase value of a planar area that stands for a three-dimensional shape of said target object for measurement as a reference phase image; said image projection point search unit extracting, from said reference phase image, a linear area containing pixels having phases equal to phases of said reference points and said target point, as a search straight line, and searching for said image projection points on said search straight line.

14. The distance measurement apparatus according to claim 11, wherein said image projection point search unit takes phase values of a plurality of planar areas that stand for a three-dimensional shape of said target object for measurement, as a reference phase image; said image projection point search unit extracting, from said reference phase image, a linear area containing pixels having phases equal to phases of said reference points and said target point, as a search straight line, and searching for said image projection points on said search straight line.

15. The distance measurement apparatus according to claim 11, wherein said reference phase image is measured at the same time as the phase of said target point is measured.

16. A distance measurement method, in which a depth distance down to a target point is measured based on a phase which is a quantity representing a change of a pattern projected on a target point whose depth distance is to be measured; said pattern being varied depending on directions of projection from pattern projection unit; said phase being measured by observing a reflection of said pattern; said method comprising:
calculating a phase cross ratio based on a phase of said target point and phases of three reference points lying on a line of light on which the said target point has been measured, and for outputting the phase cross ratio calculated; and
calculating a depth distance of said target point, based on depth distances of said reference points and said phase cross ratio, by exploiting the equality of said phase cross ratio and a depth distance cross ratio of depth distances among said reference points and said target point, termed as "depth distance calculating step" hereafter.

17. The distance measurement method according to claim 16, further comprising:
calculating three-dimensional coordinates of said target point based on geometrical model parameters regarding a position relative to a measurement coordinate system, orientation and the focal length of said pattern projection unit which has observed said pattern, and the depth distance of said target point.

18. The distance measurement method according to claim 16, wherein
said phase cross ratio calculating step selects three out of four or more reference points on said line of sight on which said target point has been measured, as proximity points, said three points having phase values closest to the phase of said target point;

said calculating said phase cross ratio step calculating said phase cross ratio which is a ratio of the phases of said proximity points and said target point;

said calculating said depth distance step taking said proximity points as said reference points.

19. A non-transitory computer-readable medium storing program that allows a computer to execute the processing in the distance measurement method according to claim 16.

20. A distance measurement method in which a depth distance down to a target point is measured based on a phase which is a quantity representing a change of a pattern projected on a target point whose depth distance is to be measured; said pattern being varied depending on directions of projection from pattern projection unit; said phase being measured by observing a reflection of said pattern; said method comprising:

searching for image projection points which are points of coincidence of phase values of said target point and phases of said reference points on said reference phase image, based on a reference phase image, phases and depth distances of three reference points on a line of sight on which said target point has been measured, and on the phase of said target point; said reference phase image being phases measured of a straight line on a surface of said object; said image projection point search step calculating distances among said image projection points and taking the distances calculated as image distances;

calculating a cross ratio of distances among said image projection points as an image distance cross ratio, based on said image distances, termed as "image distance cross ratio calculating step" hereafter; and calculating a depth distance of said target point, based on the depth distances of said reference points and said image distance cross ratio, by exploiting the equality of said image distance cross ratio and a depth distance cross ratio of the depth distances among said reference points and said target point, termed as "depth distance calculating step" hereafter.

* * * * *